(12) United States Patent
Fox et al.

(10) Patent No.: US 11,645,610 B2
(45) Date of Patent: May 9, 2023

(54) SYSTEM AND METHOD FOR DETERRING THEFT OF PACKAGE, AND DEVICE THEREFOR

(71) Applicant: ZFLO TECHNOLOGIES LLC, Austin, TX (US)

(72) Inventors: Larry Fox, Austin, TX (US); Derrick Gaderson, Austin, TX (US); Jeff Theisen, Austin, TX (US); Michael Geminden, Austin, TX (US)

(73) Assignee: ZFLO TECHNOLOGIES LLC, Austin, TX (US)

( * ) Notice: Subject to any disclaimer, the term of this patent is extended or adjusted under 35 U.S.C. 154(b) by 71 days.

(21) Appl. No.: 17/317,808

(22) Filed: May 11, 2021

(65) Prior Publication Data

US 2022/0051182 A1 Feb. 17, 2022

Related U.S. Application Data

(60) Provisional application No. 63/065,495, filed on Aug. 13, 2020.

(51) Int. Cl.
*G06Q 10/08* (2023.01)
*G06Q 10/0833* (2023.01)
(Continued)

(52) U.S. Cl.
CPC ......... *G06Q 10/0833* (2013.01); *G08B 15/02* (2013.01); *G08B 25/008* (2013.01);
(Continued)

(58) Field of Classification Search
CPC .......................... G06Q 10/083; G06Q 10/0833
(Continued)

(56) References Cited

U.S. PATENT DOCUMENTS 6,285,916 B1 9/2001 Kadaba et al.
6,509,830 B1 1/2003 Elliott
(Continued)

FOREIGN PATENT DOCUMENTS

CN 110796412 2/2020
JP 2010020793 1/2010
JP 2017532691 11/2017

OTHER PUBLICATIONS

Kizy Tracking; Real-Time Parcel Tracking; https://www.kizytracking.com/parcel-tracking/.
(Continued)

*Primary Examiner* — Kiet M Doan
(74) *Attorney, Agent, or Firm* — Hulsey P.C.

(57) ABSTRACT

A system, method, and a package tracking device for tracking the movement of a package to prevent theft of the package are described. According to an embodiment, a package tracking device adapted to be attached with a package is described. The package tracking device having a unique device identification number allows a user, through an application interface running of a wireless communication device, to associate a geographical boundary (geofencing) with the delivery address of the package. The package tracking device operates in a passive tracking mode when the package is within the defined geographical boundary, generates a first signal when the package is moved from a drop location, generates a second signal when the package is moved out from the geofencing associated with the delivery address and operates in active tracking mode when the package is moved out from the geofencing associated with the delivery address.

24 Claims, 15 Drawing Sheets

(51) Int. Cl.
   *H04W 4/021* (2018.01)
   *G08B 15/02* (2006.01)
   *H04W 4/14* (2009.01)
   *G08B 25/00* (2006.01)
   *H04W 4/029* (2018.01)

(52) U.S. Cl.
   CPC ........... *H04W 4/021* (2013.01); *H04W 4/029* (2018.02); *H04W 4/14* (2013.01)

(58) Field of Classification Search
   USPC .................. 370/255; 382/121; 455/404.1
   See application file for complete search history.

(56) References Cited

U.S. PATENT DOCUMENTS

| | | | |
|---|---|---|---|
| 6,509,867 | B1 | 1/2003 | McGibney |
| 7,366,522 | B2 | 4/2008 | Thomas |
| 8,015,023 | B1 | 9/2011 | Lee et al. |
| 8,725,165 | B2 | 5/2014 | Lau et al. |
| 9,602,964 | B1 | 3/2017 | Agarwal et al. |
| 9,892,353 | B1 | 2/2018 | Lui et al. |
| 10,602,339 | B2 | 3/2020 | Maheswaranathan |
| 10,650,654 | B2 | 5/2020 | Batra et al. |
| 10,771,926 | B1 | 9/2020 | Carr |
| 10,841,736 | B1 | 11/2020 | de la Broise |
| 2004/0233065 | A1 | 11/2004 | Freeman |
| 2007/0222587 | A1 | 9/2007 | Crider et al. |
| 2014/0221797 | A1* | 8/2014 | Bailey .................. A61B 5/0205 600/595 |
| 2014/0240088 | A1 | 8/2014 | Robinette et al. |
| 2019/0287063 | A1* | 9/2019 | Skaaksrud ............. B65G 67/24 |
| 2022/0189277 | A1* | 6/2022 | Brown .................. A01K 11/008 |

OTHER PUBLICATIONS

Tomtom; Vehicle and Asset Tracking; https://www.tomtom.com/use-cases/vehicle-and-asset-tracking/?gclid=CjwKCAiAp4KCBhB6EiwAxRxbpPVjCro9y-nvsXN C04vK _ xEFbsC_ 0LYFX85LknAUVKe3KaeasA9ouxoCLrlQAvD_BwE.

Wang, Yuhui et al.; A Uniform Parcel Delivery System Based on IoT; https://www.scirp.org/journal/paperinformation.aspx?paperid=87843.

Burt, Chris; Amazon patent filing describes computer vision parcel theft protection system for smart home devices; https://www.biometricupdate.com/201905/amazon-patent-filing-describes-computer-vision-parcel-theft-protection-system-for-smart-home-devices.

Shiphawk; Shipment Tracking Software; https://shiphawk.com/shipment-tracking-software/.

* cited by examiner

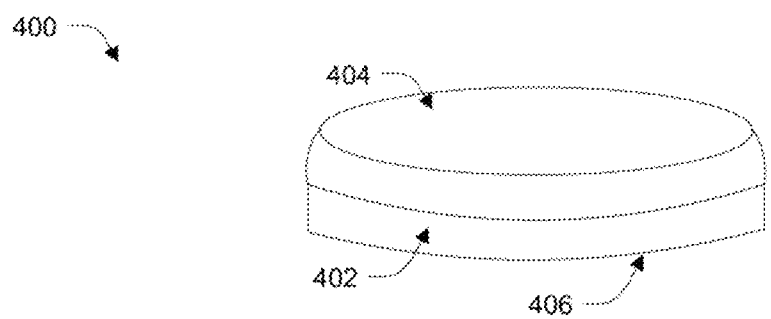
FIG. 4
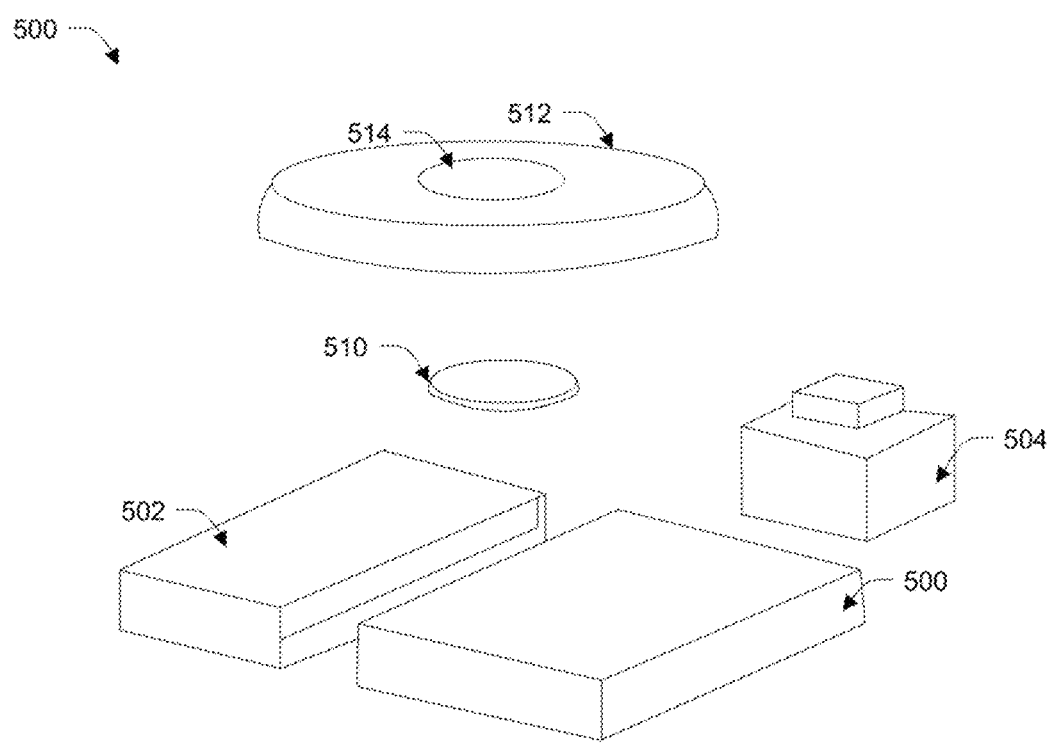
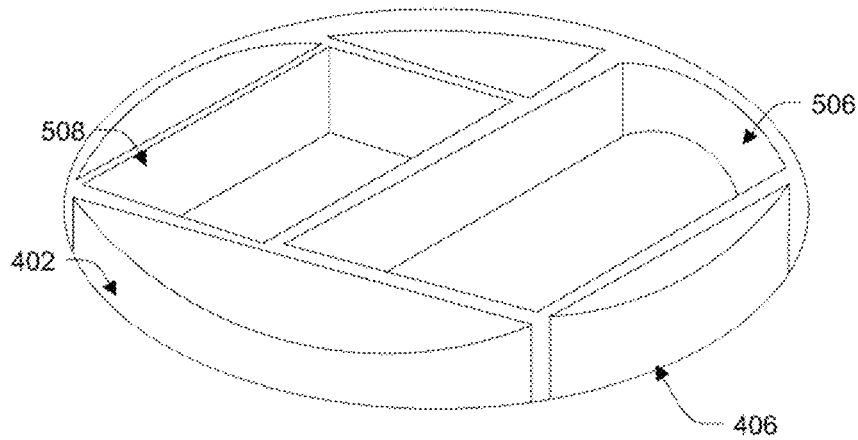
FIG. 5

| Tracking Number | Tracking Number | Delivery Date | Status | Action | : |
|---|---|---|---|---|---|
| ☐ | | | | | |
| ☐ | 2342354325 | 24 Oct 2018 01:07AM | Armed | Disarm | See Details |
| ☐ | 2342354325 | 24 Oct 2018 01:07AM | In Transit | Arm | See Details |
| ☐ | 2342354325 | 24 Oct 2018 01:07AM | Movement Detected | Report | See Details |
| ☐ | 2342354325 | 24 Oct 2018 01:07AM | Armed | Disarm | See Details |
| ☐ | 2342354325 | 24 Oct 2018 01:07AM | In Transit | Arm | See Details |
| ☐ | 2342354325 | 24 Oct 2018 01:07AM | Movement Detected | Report | See Details |
| ☐ | 2342354325 | 24 Oct 2018 01:07AM | Armed | Disarm | See Details |
| ☐ | 2342354325 | 24 Oct 2018 01:07AM | Alarm Triggered | Arm | See Details |
| ☐ | 2342354325 | 24 Oct 2018 01:07AM | Movement Detected | Report | See Details |

URL

List of Shipments

SYSTEM AND METHOD FOR DETERRING THEFT OF PACKAGE, AND DEVICE THEREFOR

CROSS REFERENCE TO RELATED APPLICATIONS

This application claims benefit to the following provisional and non-provisional application, which is here expressly incorporated herein by reference:

U.S. Provisional Patent Application Ser. No. 63/065,495, titled "SYSTEM AND METHOD FOR PREVENTING THEFT OF PACKAGE, AND DEVICE THEREFOR," filed on Aug. 13, 2020.

FIELD OF THE PRESENT DISCLOSURE

The present disclosure generally relates to a package tracking device and, more specifically, to a package tracking device for deterring theft of the package by alerting a recipient of the package about the possible theft. The present disclosure further relates to a package tracking device, which is physically associated with the package, allowing the recipient to track the package to prevent theft of a package.

BACKGROUND OF THE DISCLOSURE

There are several scenarios where the owner of a package or an item may want to keep a close eye on the package or the item once it is delivered to a destination address. For example, a user may want to keep an eye on packages delivered to a destination address (e.g., door of a house), a retail establishment may want to keep track of all items delivered at a facility, and an IT manager may want to keep track of IT assets belonging to an organization. They may want to get an alert when the package or the item is moved away from the house door or from the facility without prior authorization.

E-Commerce shopping has revolutionized the way consumers shop. Everything from hair care products to gourmet meals for pets can be purchased online and delivered directly to the front door within hours. Amazon® alone sold over six billion products and shipped over 650 million packages. However, the convenience of online shopping can also come with unexpected drawbacks, such as coming home to find the delivered package that has been stolen. The standard package delivery process is for the delivery person to simply leave the package on the consumer's porch before driving on to the next house. This is problematic for several reasons, including making it far too easy for thieves to grab packages lying on porches or the like, with little consequences.

In a 2019 Package Theft Statistics Report, it was found that 44% of respondents receive some type of package on a weekly basis. On average, respondents said they get 45 packages delivered to their homes per year. Amazon Prime Members® responded that they get about 51 packages delivered annually, and non-members responded that they receive about 25 packages delivered annually. Overall, respondents said they spend an average of $222 per month on online orders. With one single package potentially containing hundreds of dollars' worth of goods, package thieves see this as a ripe opportunity to steal. The survey found that more than one-third (about 36%) of respondents have been a victim of package theft at least once. Of those, 44% have had a package stolen at least twice. While exact numbers are not available, package theft affects the shipper and responsible party just as much as the consumer. For example, with an average cost of $109 to Amazon (logistics, paperwork, claim department employees) to replace a stolen or lost package in addition to the original cost, the package theft causes about $9 Billion of loss to Amazon every year, hurting their business as well.

Package theft is often a crime of opportunity. It frequently happens when persons are not at home and unable to bring packages into their homes. To help put their minds at ease, people try different methods and deterrents to help prevent package theft. For example, consumers choose methods like having packages delivered to their work address, to the home of a relative or friend, a local post office, or "Ship to Store" for pickup. However, the challenge is these methods put limitations on the convenience of home delivery. Some e-commerce and/or partner delivery service providers offer a "locker" feature that allows the consumer to pick up their package from a secure location at their convenience, but again this puts a constraint for the consumer to take time out for pick-up. Some of these locker services, requiring signatures or even scheduling a specific time for delivery, can cause the consumer to change their experience of delivery out of the norm. This can cause the consumer to potentially not have its next purchase delivered, which in turn hurts the shipper's business.

Further, in order to prevent package thefts, some consumers take measures in the form of home security. The most popular is to install a doorbell camera such as Ring®, Google Nest®, Vivint®, or the like. These video doorbell cameras allow homeowners to monitor their entryways 24/7 and record the footage to deter would-be thieves. However, getting a doorbell camera is an upfront expense and requires installation. Further, it may require a subscription for cloud recording, which adds up to the cost. Some companies, like Landport®, provide secure lockboxes that allow various mail carriers to leave the packages in a concealed and secured container. But this also requires a hefty upfront cost. Amazon Key® is also an option for Amazon consumers that connects smart locks and WiFi in-home cameras to an app that allows the consumer to control the locking and unlocking of the door. When Amazon orders arrive, the consumer can pre-authorize a delivery that unlocks the door for the delivery person allowing her or him to slip the package inside the door and close the door before it automatically locks. However, again, this is an expensive service and requires allowing a stranger (delivery person) to be let in the house, which may not be preferable.

There are several existing solutions for tracking for package or an article covering different use cases (e.g., package tracking during shipment, tracking an article for a rescue operation, or tracking of a valuable item, etc.). One such solution is described in the U.S. Pat. No. 8,725,165, titled "Method and system for providing shipment tracking and notifications" (the '165 patent). The '165 patent describes a method and system for providing shipment tracking and notification. The patent teaches improved approaches for monitoring the status of articles being shipped. The monitoring can produce notifications to interested parties. The notifications typically contain status information pertaining to the articles being shipped. Alternatively, interested parties can gain access to status information pertaining to the articles being shipped via a website. According to one embodiment, the status information includes at least position (location) information and shipping conditions information. The existing solutions either don't solve the issue of package theft after delivery of package. The active tracking is disabled once the package is delivered.

A U.S. Pat. No. 10,650,654 titled "System and method for monitoring and tracking items" (the '654 patent) discloses a method, system, and non-transitory computer-readable medium. The method includes determining, by a server, an inventory of tags in communication with a gateway using a first wireless communication mode, and enabling, in response to a first triggering event recognized by a tag, a second wireless communication mode. The method also includes enabling, in response to a second triggering event recognized by the tag, a third wireless communication mode, and a location detection capability of the tag. The method further includes determining, by the tag, a geographic location of the tag using a location detection capability, and transmitting, using the third wireless communication mode, to a server the geographic location of the tag. The method of the '654 patent prevents theft of a valuable item by sending an alert to a server from the tag through any of the available communication modes (first wireless communication mode, second wireless communication mode, and a third communication mode. The tag shares the geographical location with the server. The '654 patent addresses the issue-reporting location information from the tag to the server through a conditionally selected communication mode.

Another U.S. Pat. No. 10,602,339 titled "Systems and methods for improving alert messaging using a device to device communication" (the '339 patent) describes a method, apparatus, and computer program product to initiate a message and communication on behalf of one or more tracking devices or initiate a request for location information associated with one or more tracking devices. The method includes pairing at least a first device with at least one tracking device that is associated with a user, wherein the first device is configured to interact with at least one tracking device. The method further includes detecting an alert condition with respect to at least one tracking device and initiating a message request to at least one tracking device. The method further includes causing an alert message comprising the location information associated with at least one tracking device to be transmitted.

Existing tags or tracking devices keep sharing location information with the server. Continuous sharing of location information may drain the battery of the tag or tracking device very quickly. These solutions are not optimal for the theft prevention of package delivered at the door or when the package or an item is moved outside a defined boundary.

Therefore, in light of the foregoing discussion, there exists a need to overcome problems associated with conventional means for package delivery and package tracking in order to prevent theft of a package.

BRIEF SUMMARY OF THE DISCLOSURE

Embodiments of the present disclosure describe a system, method, and package tracking device for tracking the movement of a package to prevent theft of the package. In an embodiment, a package tracking device adapted to be attached with a package for tracking is described. The package tracking device enables a user, through an application interface running on a wireless communication device, to associate a geographical boundary (geo-fencing) with the delivery address of the package and track the movement of the package after delivery. The package tracking device operates in a passive tracking mode when the package is within the defined geographical boundary, generates a first signal when the package is moved from a delivery location, generates a second signal when the package is moved out from the geofencing associated with the delivery address and operates in active tracking mode when the package is moved out from the geofencing associated with the delivery address. The package tracking device, running in the passive tracking mode, shares live location information to a server or to an application running of a user device at a first frequency. The packet tracking device, running in the active tracking mode, shares live location with the server or to the application running on the user device at a second frequency, which is higher than the first frequency. In an embodiment, the package tracking device, running in active tracking mode, may continuously share the live location with the user server or the application running of the user device.

The passive tracking mode is triggered automatically when the package enters the defined geographical boundary or on receipt of an arm signal from the server. When the package is dropped, a notification of package delivery is sent to a registered recipient, and the package delivery status is updated at the server. In another embodiment, the passive tracking mode is initiated on receiving a passive mode activation signal (also referred to as arm signal) from the server. The server sends the passive mode activation signal (arm signal) when the delivery of the package is confirmed by a delivery person to the server. In an embodiment, the package tracking device includes a passive mode activation button that can be pressed by the delivery person to confirm delivery of the package and to activate the passive tracking mode.

In an embodiment, the package tracking device includes a controller, a motion-sensing module to detect motion when the package is moved from drop location, a location determination module configured to determine location coordinates of the package tracking device, and a communication module configured to send the location coordinates of the package tracking device, along with information about a unique device identification number of the package tracking device thereof, to the user device and to the server. The package tracking device includes a memory unit to store configurable instructions.

In an embodiment, the controller reads the configuration instructions to activate the motion sensing module, the location determination module, receives location information, and shares the location information with the server.

In an embodiment, the package tracking device includes a motion-sensing module that is activated on receiving the arm signal. The package tracking device may generate a motion signal when any motion is detected after activation of the motion-sensing module. The motion-sensing module detects the motion of the package tracking device and generates a motion signal. The controller is configured to activate the motion sensing module upon generation of the arm signal such that the motion-sensing module, when activated, is configured to generate a motion signal (also referred to as the first signal) upon detection of the motion of the package tracking device.

Further, the controller is configured to control the location determination module to initiate the determination of the location coordinates of the package tracking device upon generation of the arm signal. The location determination module can be configured to initiate the determination of the location coordinates of the package tracking device upon the generation of the motion signal. In an embodiment, the package tracking device may work without the motion detection module, and the motion signal can be generated based on change of location information captured by the location determination module. In one or more embodiments, the controller is configured to control the location determination module to determine the location coordinates of the package tracking device, running in passive tracking mode, at a first frequency upon generation of the arm signal. The controller is configured to control the location determination module to determine the location coordinate of the package tracking device, running in the active tracking mode, at a second frequency upon generation of the second signal, with the second frequency being higher than the first frequency. Herein, the second frequency is defined based on a preset condition including at least one of a preset time interval and a preset distance interval from the outside of the predefined distance threshold from the package delivery location (also referred to as delivery site coordinates).

In one or more embodiments, the package tracking device further includes a speaker module. Herein, the controller is configured to activate the speaker module to generate an alarm sound upon the generation of the first signal and the second signal. The package tracking device includes a speaker that plays a warning chirp when the first signal is generated and plays a louder warning sound when the second signal is generated. The package tracking device sends notifications (e.g., SMS, social media communication, or automated voice call) to the registered recipient on a user device and updates the package status on the application interface. The notifications may contain information pertaining to alert type, the live location information of the package, and other package information (e.g., sender details, item description, etc.).

In one or more embodiments, the package tracking device further includes a microphone module. Herein, the controller is configured to activate the microphone module to record sound upon generation of the first signal.

In one or more embodiments, the package tracking device further includes a dye pack module having a trigger associated with a dye pack. Herein, the controller is configured to activate the trigger for releasing of dye from the dye pack upon generation of the second signal.

In an embodiment, a system tracking the movement of a package to prevent theft of the package is described. The system includes a remote computer (e.g., a server), a package tracking device that is associated with a package to be tracked, and an application interface to perform different configuration settings. The remote computer is configured to retrieve information about the package, including one or more unique package identification numbers, sender details, recipient details, and package delivery site coordinates (also referred to as delivery address). The server associates a package tracking device with the package. The server is further configured to link the unique package identification number (e.g., shipment number) of the package with the unique device identification number of the package tracking device associated therewith.

In one or more embodiments, the server is configured to retrieve information about the delivery of the package based on the sender details and generate an arm signal upon confirmation of the package being delivered. The server may send an instruction to the package tracking device to operate a motion-sensing module and a location determination module to operate in passive tracking and receive signals when the movement of the package is detected or when the package is moved outside a defined geo fencing. The server receives the first notification (also referred interchangeably as the first signal) from the package tracking device when the movement of the package is detected either by the motion detection module or the location determination module. The server receives a second notification (also referred interchangeably as a second signal) from the package tracking device on a determination that the package is moved outside the geofencing. The package tracking device of the system, when operating in passive mode, may share location information at a first frequency. The package tracking device of the system, on the generation of the second signal, starts operating in active tracking mode and shares the location information at second frequency that is higher than the first frequency. In an embodiment, the server may push appropriate notification to applications running on the user device or send SMS or email to original recipient of the package on receipt of the first notification and the second notification.

In one or more embodiments, the system includes a user application adapted to be installed on a user device of the recipient of the package to establish communication with the server. The user application is configured to allow the recipient to check the last determined location coordinates of the package tracking device. In one or more embodiments, the user application is further configured to allow the recipient to set the predefined distance threshold or associate a geo fencing with the delivery address.

In another aspect, a method for tracking the movement of a package is described. The method includes steps of physically attaching a package with a package tracking device having a unique device identification number and associating a geofencing with the delivery address of the package. The method includes steps of activating, on receipt of an arm signal, the package tracking device to operate in a passive tracking mode, in which location updates are sent from the package tracking device to a remote computer at a first frequency. The method includes steps of activating, on generation of a second notification, the package tracking device to operate in an active tracking mode, in which location updates are sent from the package tracking device to a removed computer at a second frequency that is higher than the first frequency. The second notification is generated when the package is moved outside the geofencing.

In an embodiment, the package tracking device receives the arm signal from the remote computer on confirmation of delivery of the package to the destination address. The location information associated with the geo-fencing is stored in a local memory of the package tracking device, and the arm signal by the package tracking device is autogenerated when the package tracking device enters the geofencing. The method further includes steps of generating and sending the first notification by the package tracking device when a movement of the package is detected. The movement of the package is detected by a motion-sensing module embedded with the package tracking device. The second notification is generated on a determination that the package is moved outside the geofencing, wherein the determination that the package is moved outside the geofencing is done by a location determination module embedded in the package tracking device. The second notification is sent to a user device along with the location updates and other package information.

In an embodiment, the geofencing is associated with the delivery address by a user through an application interface and is pushed to the package tracking device using the unique identification number.

The method causes the package to generate a warning sound through a speaker attached with the package tracking device when the second notification is generated.

The Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

The present subject matter will now be described in detail with reference to the drawings, which are provided as illustrative examples of the subject matter as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIG. 4 illustrates a perspective view of a package tracking device, in accordance with one or more exemplary embodiments of the present disclosure;

FIG. 5 illustrates an exploded view of the package tracking device, in accordance with one or more exemplary embodiments of the present disclosure;

FIG. 16 illustrates an example application interface used to track status of different packages, in accordance with one or more exemplary embodiments of the present disclosure.

DETAILED DESCRIPTION OF THE EMBODIMENTS

Figure 1:
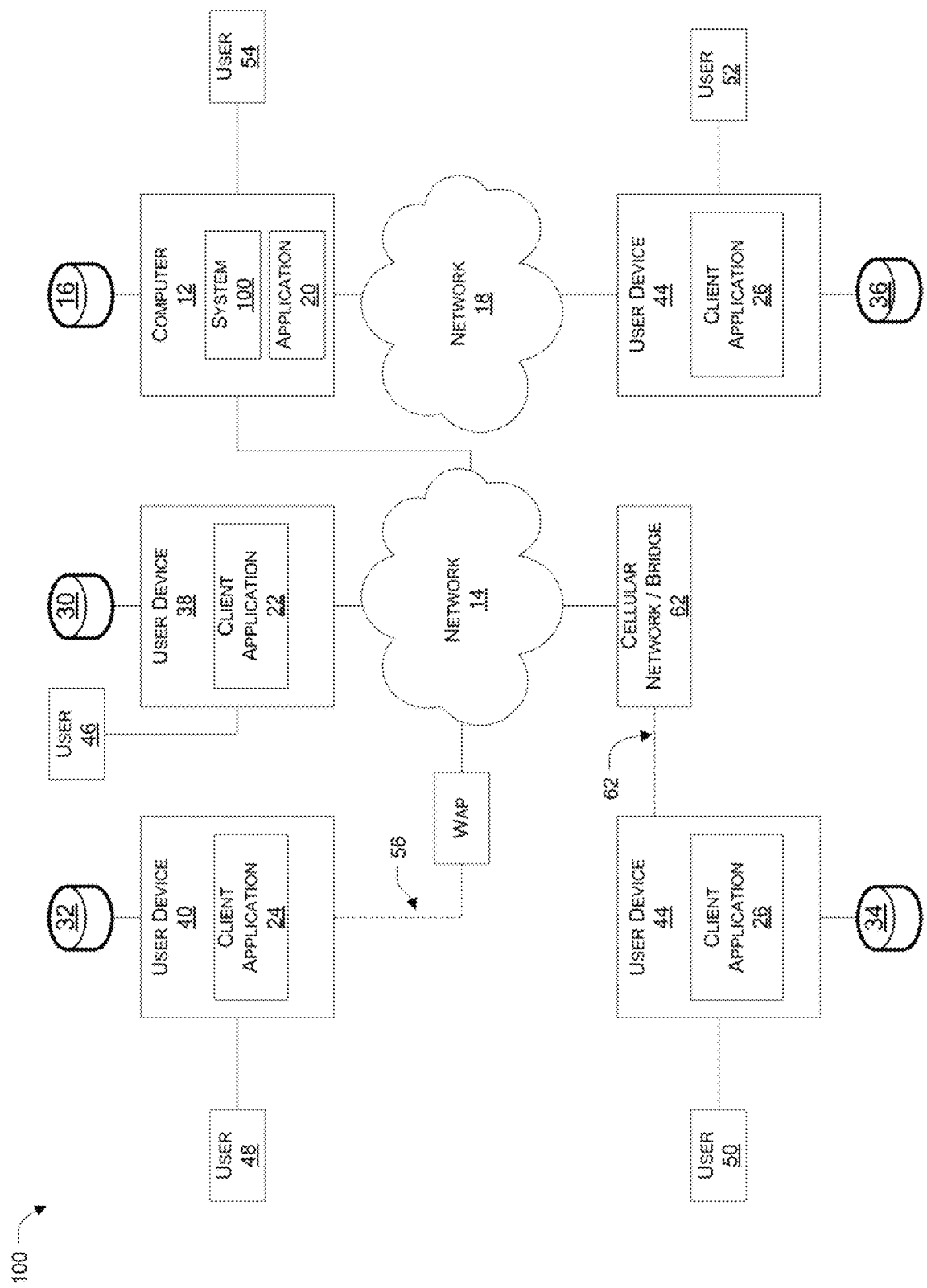
FIG. 1 illustrates a system that may reside on and may be executed by a computer, which may be connected to a network, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity but rather denote the presence of at least one of the referenced items. Moreover, various features are described, which may be exhibited by some embodiments and not by others. Similarly, various requirements are described, which may be requirements for some embodiments but not for other embodiments.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments described herein may be discussed in the general context of computer-executable instructions residing on some form of computer-readable storage media, such as program modules, executed by one or more computers or other devices. By way of example, and not limitation, computer-readable storage media may include non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, any suitable computer-usable or computer-readable medium (or media) may be utilized. The computer-readable medium may be a computer-readable signal medium or a computer-readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a Digital Versatile Disk (DVD), a static random access memory (SRAM), a memory stick, a floppy disk, a mechanically encoded device such as punch-cards or raised structures in a groove having instructions recorded thereon, a media such as those supporting the Internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in computer memory. In the context of the present disclosure, a computer-usable or computer-readable, the storage medium may be any tangible medium that can contain or store a program for use by or in connection with the instruction execution system, apparatus, or device.

In some implementations, a computer-readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer-readable program code may be transmitted using any appropriate medium, including but not limited to, the internet, wireline, optical fiber cable, RF, etc. In some implementations, a computer-readable signal medium may be any computer-readable medium that is not a computer-readable storage medium, and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, TensorFlow, Bazel, C, C++. Further, the decoder in the user device (as will be discussed) may use C, C++, or any processor-specific ISA. Furthermore, assembly code inside C/C++ may be utilized for the specific operation. Also, ASR (automatic speech recognition) and G2P decoder along with the entire user system can be run in embedded Linux (any distribution), Android, iOS, Windows, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer-readable program instructions/code by utilizing state information of the computer-readable program instructions to personalize the electronic circuitry, in order to perform aspects of the present disclosure.

In some implementations, the flowchart and block diagrams in the Figures illustrate the architecture, functionality, and operation of possible implementations of apparatus (systems), methods, and computer program products according to various implementations of the present disclosure. Each block in the flowchart and/or block diagrams, and combinations of blocks in the flowchart and/or block diagrams, may represent a module, segment, or portion of code, which includes one or more executable computer program instructions for implementing the specified logical function(s)/act(s). These computer program instructions may be provided to a processor of a general-purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer-implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a system 100 for deterring theft of a package. System 100 may reside on and may be executed by computer 12, which may be connected to a network (e.g., network 14) (e.g., the internet or a local area network). Examples of computer 12 may include but are not limited to a personal computer(s), a laptop computer(s), a mobile computing device(s), a server computer, a series of server computers, a mainframe computer(s), or a computing cloud(s). In some implementations, each of the aforementioned may be generally described as a computing device. In certain implementations, a computing device may be a physical or virtual device. In some embodiment, the computer 12 is also referred to as a remote computer. In many implementations, a computing device may be any device capable of performing operations, such as a dedicated processor, a portion of a processor, a virtual processor, a portion of a virtual processor, a portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries, or both; Mac and OS X are registered trademarks of Apple Inc. in the United States, other countries, or both; Red Hat is a registered trademark of Red Hat Corporation in the United States, other countries or both; and Linux is a registered trademark of Linus Torvalds in the United States, other countries or both).

In some implementations, the instruction sets and subroutines of system 100, which may be stored on storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other arrays); a random-access memory (RAM); and a read-only memory (ROM).

In some implementations, network 14 may be connected to one or more secondary networks (e.g., network 18), examples of which may include but are not limited to: a local area network, a wide area network, or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc., described throughout the present disclosure may be stored in the data store. In some implementations, computer 12 may utilize any known database management system, such as but not limited to DB2, in order to provide multi-user access to one or more databases, such as the above noted relational database. In some implementations, the data store may also be a custom database, such as, for example, a flat-file database or an XML database. In some implementations, any other form(s) of a data storage structure and/or organization may also be used. In some implementations, system 100 may be a component of the data store, a standalone application that interfaces with the above-noted data store and/or an applet/application that is accessed via client applications 22, 24, 26, 28. In some implementations, the above-noted data store may be, in whole or in part, distributed in a cloud computing topology. In this way, computer 12 and storage device 16 may refer to multiple devices, which may also be distributed throughout the network.

In some implementations, computer 12 may execute application 20 for deterring theft of a package (as discussed later in more detail). In some implementations, system 100 and/or application 20 may be accessed via one or more of client applications 22, 24, 26, 28. In some implementations, system 100 may be a standalone application or maybe an applet/application/script/extension that may interact with and/or be executed within application 20, a component of application 20, and/or one or more of client applications 22, 24, 26, 28. In some implementations, application 20 may be a standalone application or maybe an applet/application/script/extension that may interact with and/or be executed within system 100, a component of system 100, and/or one or more of client applications 22, 24, 26, 28. In some implementations, one or more of client applications 22, 24, 26, 28 may be a standalone application or maybe an applet/application/script/extension that may interact with and/or be executed within and/or be a component of the system 100 and/or application 20. Examples of client applications 22, 24, 26, 28 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to user devices 38, 40, 42, 44, maybe executed by one or more processors and one or more memory architectures incorporated into user devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of user devices 38, 40, 42, 44 (and/or computer 12) may include, but are not limited to, a personal computer (e.g., the user device 38), a laptop computer (e.g., the user device 40), a smart/data-enabled, cellular phone (e.g., the user device 42), a notebook computer (e.g., the user device 44), a tablet (not shown), a server (not shown), a television (not shown), a smart television (not shown), a media (e.g., video, photo, etc.) capturing device (not shown), and a dedicated network device (not shown). User devices 38, 40, 42, 44 may each execute an operating system, examples of which may include but are not limited to, Android®, Apple® iOS®, Mac® OS X®; Red Hat® Linux®, or a custom operating system.

In some implementations, one or more of client applications 22, 24, 26, 28 may be configured to effectuate some or all of the functionality of system 100 (and vice versa). Accordingly, in some implementations, system 100 may be a purely server-side application, a purely client-side application, or a hybrid server-side/client-side application that is cooperatively executed by one or more of client applications 22, 24, 26, 28, and/or system 100.

In some implementations, one or more of client applications 22, 24, 26, 28 may be configured to effectuate some or all of the functionality of application 20 (and vice versa). Accordingly, in some implementations, application 20 may be a purely server-side application, a purely client-side application, or a hybrid server-side/client-side application that is cooperatively executed by one or more of client applications 22, 24, 26, 28, and/or application 20. As one or more of client applications 22, 24, 26, 28, system 100, and application 20, taken singly or in any combination, may effectuate some or all of the same functionality, any description of effectuating such functionality via one or more of client applications 22, 24, 26, 28, system 100, application 20, or a combination thereof, and any described interaction(s) between one or more of client applications 22, 24, 26, 28, system 100, application 20, or a combination thereof to effectuate such functionality, should be taken as an example only and not limit the scope of the disclosure.

In some implementations, one or more of users 46, 48, 50, 52 may access computer 12 and system 100 (e.g., using one or more of user devices 38, 40, 42, 44) directly through network 14 or through secondary network 18. Further, computer 12 may be connected to network 14 through network 18, as illustrated with phantom link line 54. System 100 may include one or more user interfaces, such as browsers and textual or graphical user interfaces, through which users 46, 48, 50, 52 may access system 100.

In some implementations, various user devices may be directly or indirectly coupled to the communication network, such as network 14 and network 18. For example, user device 38 is shown directly coupled to network 14 via a hardwired network connection. Further, user device 44 is shown directly coupled to network 18 via a hardwired network connection. The user device 40 is shown wirelessly coupled to network 14 via wireless communication channel 56 established between user device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between user device 40 and WAP 58. The user device 42 is shown wirelessly coupled to network 14 via wireless communication channel 60 established between user device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that allows, e.g., mobile phones, computers, smartphones, and other electronic devices to be interconnected using a short-range wireless connection. Other forms of interconnection (e.g., Near Field Communication (NFC)) may also be used.

Figure 2:
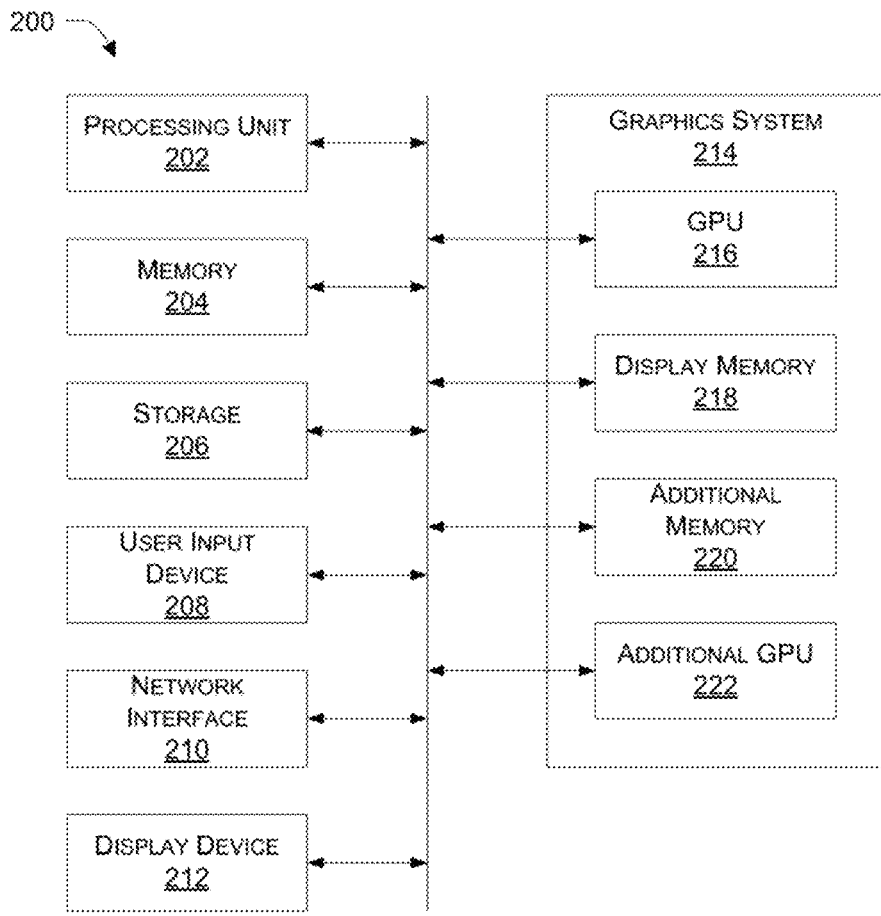
FIG. 2 illustrates a diagrammatic view of a server, in accordance with one or more exemplary embodiments of the present disclosure.

System 100 includes server 200, as shown in FIG. 2). Herein, FIG. 2 is a block diagram of an example of server 200 capable of implementing embodiments according to the present disclosure. In one embodiment, an application server as described herein may be implemented on exemplary server 200. In the example of FIG. 2, server 200 includes processing unit 202 (hereinafter referred to as CPU 202) for running software applications (such as the application 20 of FIG. 1) and optionally an operating system. As illustrated, server 200 further includes database 204 (hereinafter, sometimes referred to as memory 204), which stores applications and data for use by CPU 202. Storage 206 provides non-volatile storage for applications and data and may include fixed disk drives, removable disk drives, flash memory devices, and CD-ROM, DVD-ROM, or other optical storage devices. Optional user input device 208 includes devices that communicate user inputs from one or more users to server 200 and may include keyboards, mice, joysticks, touch screens, etc. Communication or network interface 210 is provided, which allows server 200 to communicate with other computer systems via an electronic communications network, including wired and/or wireless communication and including an Intranet or the Internet. In one embodiment, server 200 receives instructions and user inputs from a remote computer through communication interface 210. Communication interface 210 can include a transmitter and receiver for communicating with remote devices. Optional display device 212 may be provided, which can be any device capable of displaying visual information in response to a signal from processing unit 202, in server 200.

In the embodiment of FIG. 2, graphics system 214 may be coupled with data bus 260 and the components of server 200. Graphics system 214 may include physical graphics processing unit (GPU) 216 and graphics memory. GPU 216 generates pixel data for output images from rendering commands. Physical GPU 216 may be configured as multiple virtual GPUs that may be used in parallel (concurrently) by several applications or processes executing in parallel. For example, mass scaling processes for rigid bodies or a variety of constraint solving processes may be run in parallel on the multiple virtual GPUs. Graphics memory may include display memory 220 (e.g., a frame buffer) used for storing pixel data for each pixel of an output image. In another embodiment, the display memory 220 and/or additional memory 222 may be part of memory 204 and may be shared with CPU 202. Alternatively, display memory 220 and/or additional memory 222 can be one or more separate memories provided for the exclusive use of graphics system 214. In another embodiment, graphics system 214 includes one or more additional GPUs 224. Each additional GPU 224 may be adapted to operate in parallel with GPU 216. Each additional GPU 224 generates pixel data for output images from rendering commands. Each additional physical GPU 224 can be configured as multiple virtual GPUs that may be used in parallel (concurrently) by several applications or processes executing in parallel, e.g., processes that solve constraints. Each additional GPU 224 can operate in conjunction with GPU 216, for example, to simultaneously generate pixel data for different portions of an output image or to simultaneously generate pixel data for different output images. Each additional GPU 224 may be located on the same circuit board as GPU 216, sharing a connection with GPU 216 to data bus 260, or each additional GPU 224 may be located on another circuit board separately coupled with data bus 260. Each additional GPU 224 can also be integrated into the same module or chip package as GPU 216. Each additional GPU 224 can have additional memory, similar to display memory 220 and additional memory 222, or can share memories 220 and 222 with GPU 216. It is to be understood that the circuits and/or functionality of GPU as described herein could also be implemented in other types of processors, such as general-purpose or other special-purpose coprocessors, or within a CPU. The components of server 200, including CPU 202, memory 204, data storage 206, user input devices 208, communication interface 210 and display device 212, and that of graphics system 214 may be coupled via one or more data buses 226.

Figure 3:
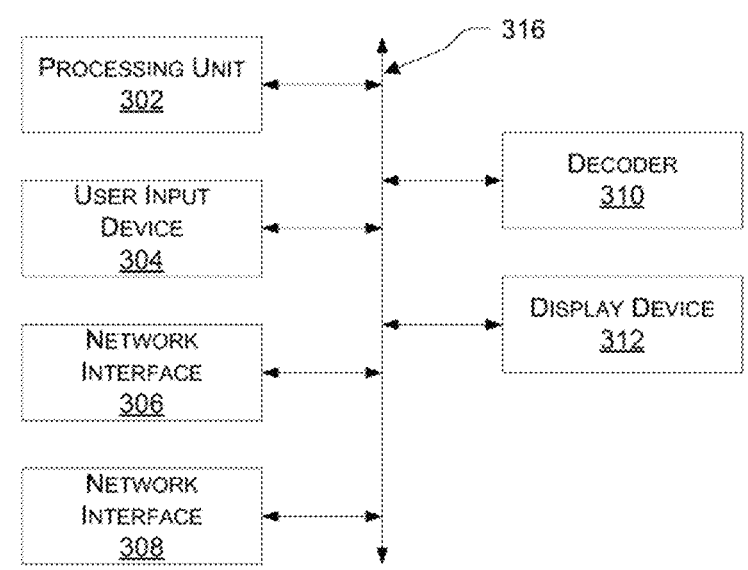
FIG. 3 illustrates a diagrammatic view of a user device, in accordance with one or more exemplary embodiments of the present disclosure.

System 100 further includes user device 300 (as shown in FIG. 3). In embodiments of the present disclosure, user device 300 may embody a smartphone, a tablet, a personal computer, a virtual assistant, a standalone physical remote control, or the like. Herein, FIG. 3 is a block diagram of an example of user device 300 capable of implementing embodiments according to the present disclosure. In the example of FIG. 3, user device 300 includes processing unit 302 (hereinafter referred to as CPU 302) for running software applications (such as application 20 of FIG. 1) and optionally an operating system. User input device 304 is provided with includes devices that communicate user inputs from one or more users and may include keyboards, mice, joysticks, touch screens, and/or microphones. Further, network interface 306 is provided, which allows user device 300 to communicate with other computer systems (e.g., server 200 of FIG. 2) via an electronic communications network, including wired and/or wireless communication and including the Internet. User device 300 may also include decoder 310 may be any device capable of decoding (decompressing) data that may be encoded (compressed). Display device 314 may be provided, which may be any device capable of displaying visual information, including information received from decoder 310. In particular, as will be described below, display device 314 may be used to display visual information received from server 200 of FIG. 2. The components of user device 300 may be coupled via one or more data buses 316.

It may be seen that as compared to server 200 in the example of FIG. 2, user device 300 in the example of FIG. 3 may have fewer components and less functionality. However, user device 300 may include other components, for example, in addition to those described above. In general, user device 300 may be any type of device that has one or more of display capabilities and the capability to receive inputs from a user and send such inputs to server 200. However, it may be appreciated that user device 300 may have additional capabilities beyond those just mentioned.

Referring now to FIGS. 4 and 5, in combination, illustrated is package tracking device 400 as part of system 100 for deterring theft of a package, in accordance with one or more exemplary embodiments of the present disclosure. As may be contemplated, the package may have details such as sender details, recipient details, and package delivery site coordinates associated therewith. Herein, the package is further provided with a unique package identification number, also referred to as shipment number. The term "unique package identification number" as used herein includes instances where such an identifier may, in fact, refer to more than one package. Some shipping systems allow more than one package to be shipped under a single tracking number or identifier. In such instances, the packages would be bound for the same destination and would, therefore, travel together from the origin location to the destination location. In this way, the single package identifier could be used to track the location of the multiple packages shipped together. In such instances, the packages would be bound and bundled for the same destination. In this way, the package tracking device 400 will be used to track each package and know the location of the multiple packages shipped together.

Package tracking device 400 includes casing 402, which houses (supports) the various electrical components required for the operation of package tracking device 400. Package tracking device 400 also includes lid 404, which may be removably or permanently attached to casing 402 to provide a closed structure to package tracking device 400, to contain the various electrical components inside casing 402 of package tracking device 400. In an example, lid 404 may be screwed to or snapped with casing 402. In other examples, lid 404 may be fixed to casing 402 by means of fasteners or the like. Casing 402 may have base surface 406, at which package tracking device 400 may be supported over any surface. Casing 402 and lid 404 may be made of a suitable rigid material with sufficient strength to withstand minor impacts and is generally weather-proof and easily moldable. In the present examples, casing 402 and lid 404 may be made of plastic materials, such as Polyvinyl Chloride (PVC), high-density polyethylene (HDPE), cross liked polyethylene (PEX), and the like. In the illustrated examples, casing 402 has been shown to have a generally cylindrical shape; however, it may be contemplated that, in other examples, casing 402 may have any other suitable, such as cuboidal or the like, without any limitations.

As discussed, the package tracking device 400 is utilized for deterring theft of the package, such as a delivery package for online purchased items. For this purpose, casing 402 is adapted to be attached to the package to physically associate package tracking device 400 with the package. Alternatively, package tracking device 400 may simply be placed inside the package without needing to be attached thereto. Casing 402 may generally be attached to the package from base surface 406 thereof. In some examples, base surface 406 may have a curved shape or the like to conform to the shape of the surface of the package to which casing 402 is attached.

In an embodiment, the package tracking device 400 may have a rubber strip or flexible band to bold a package of different dimensions. The rubber strip or flexible be rolled inside the casing and extracted to hold a package In one example, casing 402 may include an adhesive tape (not shown) or the like provided on the base surface 406 thereof, which may allow casing 402 to be adhesively attached to the package. The adhesive tape may cover substantially the entire base surface 406 of casing 402. In another example, in case the package having a metallic surface, base surface 406 may be made magnetic, or a magnet may be attached thereto to allow for attaching package tracking device 400 to metallic surfaces of the package. In yet another example, base surface 406 may include holes (not shown) through which the fasteners (not shown) may pass to fix package tracking device 400 to the package. Those skilled in the art would appreciate that alternative mechanical attachments are possible to couple package tracking device 400 to the package, including a mechanical pin or clip. In some examples, base surface 406 and/or lid 404 may be provided with padding (not shown) to protect package tracking device 400 from minor impacts while the package is in transportation.

As may be understood, it may be required to activate package tracking device 400 only and soon after being physically associated with the package. In an embodiment, battery 502 is configured to be activated upon attaching of casing 402 to the package. This way, the package tracking device 400 is, in turn, activated as soon as it is associated with the package for tracking thereof. For this purpose, in an example, base surface 406, from which package tracking device 400 is attached to the package, may be in the form of a push or rocker switch, which may get pressed when the force is applied to attach the package tracking device 400 to the package, with such pressing of the said switch causing battery 502 to be activated. In other examples, the adhesive tape may be a conductive tape, and when its cover film is removed to allow the adhesive tape to be applied to the package for attaching thereto, this may cause the generation of a small current to, in turn, cause activation of battery 502. More such techniques for automatic activation of battery 502 upon attaching of casing 402 to the package may be contemplated by a person skilled in the art without any limitations. In alternative examples, battery 502 may be manually activated each time package tracking device 400 is associated with a package for tracking thereof.

As illustrated in FIG. 5, package tracking device 400 includes controller 500 and battery 502. Controller 500 and battery 502 are arranged and supported inside casing 402. Package tracking device 400 further includes integrated connection assembly 506 configured to connect various devices and modules to controller 500 (as discussed later in the description). As may be seen, casing 402 may have slots 506 and 508 formed therein. Slots 506 and 508 are shaped and dimensioned complementary to controller 500 and battery 502, respectively, such that controller 500 may be accommodated inside slot 506 and battery 502 may be accommodated inside slot 508. In one or more examples, integrated connection assembly 506 may also be accommodated inside slot 506 along with (aside) controller 500. In an example, a base portion of slots 506 and 508 may have some adhesive applied thereto, such that the respective controller 500 and battery 502 may be fixed thereat when placed therein. Further, as illustrated, package tracking device 400 includes speaker 510 arranged inside casing 402. Package tracking device 400 includes cover 512, as a part of casing 402, with opening 514 for supporting speaker 510 therein. It may be appreciated that lid 404 may be placed over cover 512 to enclose the said components of package tracking device 400 inside casing 402. In some examples, lid 404 may be perforated (not shown) or may be provided with a mesh portion (not shown) right above the speaker to allow for speaker output to properly pass therethrough.

Herein, controller 500 may be any processing device, system, or part thereof that controls at least one operation of the device. Controller 500 may be implemented in hardware, firmware, or software, or some combination of at least two of the same. It should be noted that the functionality associated with any particular controller may be centralized or distributed, whether locally or remotely. Controller 500 may be a multi-core processor, a single-core processor, or a combination of one or more multi-core processors and one or more single-core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like. Further, the memory may include one or more non-transitory computer-readable storage media that can be read or accessed by other components in the device. The memory may be any computer-readable storage media, including volatile and/or non-volatile storage components, such as optical, magnetic, organic, or other memory or disc storage, which can be integrated in whole or in part with the device. In some examples, the memory may be implemented using a single physical device (e.g., optical, magnetic, organic, or other memory or disc storage unit), while in other embodiments, the memory may be implemented using two or more physical devices without any limitations.

Further, herein, battery 502 may be a battery pack system such as lithium-ion ("Li-ion") or nickel-metal hydride ("NiMH") battery packs. In some examples, battery 502 may be a non-rechargeable battery, such as lithium, alkaline, or other non-rechargeable battery. Such a battery may be replaced when its power level is low. In other embodiments, battery 502 may be rechargeable so that it may be recharged rather than replaced. This reduces or eliminates the need to remove battery 502 from casing 404. In some examples, battery 502 and controller 500 may be integrated. For example, to make package tracking device 400 small, controller 500 in the form Printed Circuit Board (PCB) preferably has multilayers, and two of the internal layers have a substantial area of conducting material forming two terminals for battery 502. Specifically, the PCB has pried apart at one edge, between the terminals, and battery 502 is inserted within the PCB making contact and providing voltage to the electronic components of package tracking device 400. This advantageously removes the need for a separate and weighty battery holder. In some examples, package tracking device 400 may alternatively be powered from photovoltaic cells, a wireless radio frequency method, a kinetic charging method, an inductive charging method, a switched-mode powering method, or a Thermionic conversion method.

Figure 6:
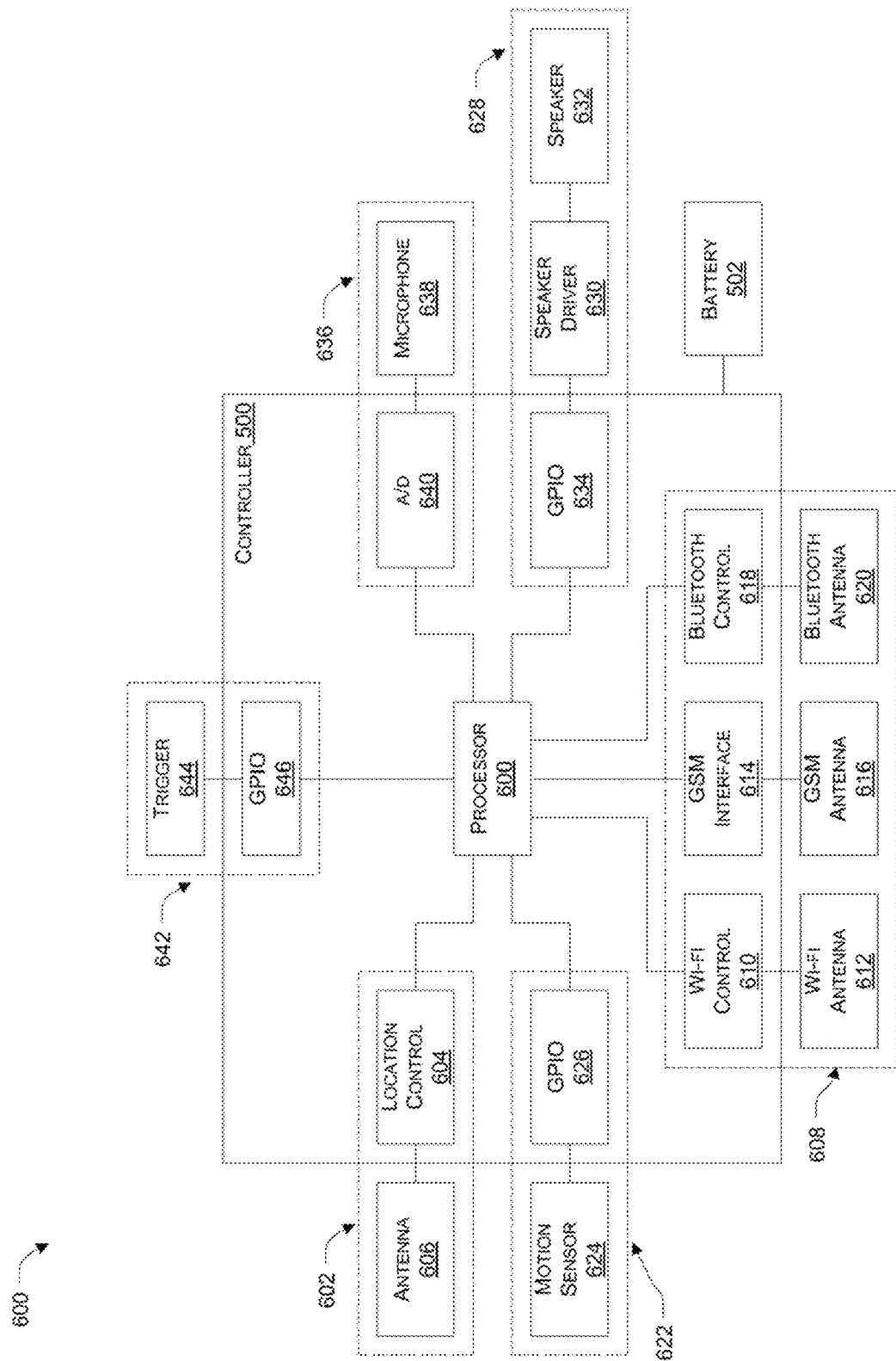
FIG. 6 illustrates a schematic block diagram of the package tracking device depicting a controller therein and its connection to various electronic components thereof, in accordance with one or more exemplary embodiments of the present disclosure.

Referring now to FIG. 6, illustrated is a schematic of package tracking device 400 depicting controller 500 and its connection to various electronic components thereof. Herein, components or modules described in terms of being included in package tracking device 400 may be considered part of controller 500 and vice-versa without any limitations. As discussed, controller 500 may be in the form of a printed circuit board (PCB) which refers in the art as to a printed board on which chips and other electronic components are placed. It should be understood that the term "printed circuit board" should not be interpreted in a limited sense as restricted to a circuit board with "printed" components, but rather in a broad sense as any type of conventional circuit board. The PCB itself can be made of a wide variety of materials such as FR4, polyamide, paper phenol, Al2O2, PTFE, a hydrocarbon with E-glass, and APPE with E-glass.

As illustrated, controller 500 includes processor 600. The term "processor" as used herein refers to an arrangement of one or more electronic elements that can be implemented in numerous ways, such as with dedicated hardware, using one or more microprocessors, microcontrollers, programmable digital signal processors, programmable gate arrays, programmable logic devices or other devices that can be programmed to perform the various functions discussed herein, or as a combination of dedicated hardware to perform some functions and programmed microprocessors and associated circuitry to perform other functions. Processor 600 can be one or more microprocessors that may be programmed using software (e.g., microcode) to perform various functions discussed herein. Processor 600 may be implemented as a combination of dedicated hardware to perform some functions and one or more programmed microprocessors along with associated circuitry to perform other functions. Examples of processor 600 that may be employed in various embodiments of the present disclosure include, but are not limited to, conventional microprocessors, application-specific integrated circuits (ASICs), and field-programmable gate arrays (FPGAs).

Further, controller 500 (or package tracking device 400) includes a location determination module 602. The location determination module 602 is configured to determine the location coordinates of package tracking device 400. The location determination module 602 includes location control 604 and antenna 606. Location control 604 may take input from antenna 606 in the form of location coordinates and transmit those to the processor for processing thereof. Antenna 606 may be in the form of Universal Mobile Telecommunications System (UMTS), AGPS (Assisted Global Positioning), Wi-Fi (IEEE 802.11), LTE (Long Term Evolution), CDMA (Code Division Multiple Access), RFID (Radio Frequency Identification) Interrogator, or Reader (Passive or Active), Rubee (IEEE P1902.1) Reader, Zigbee (IEEE 802.15.4) Reader or Gateway, Z-Wave Relay or Gateway, Wibree Transponder/Master, Bluetooth® Transponder/Master and/or GPS (Global Positioning System) device. Various types of GPS systems that are available for use include National Differential GPS System (NDGPS); Wide Area Augmentation System (WAAS); Continuously Operating Reference Station (CORS); Global Differential GPS (GDGPS), and International GNSS Service (IGS). Other types of position indicating devices may be used in place of the RFID (Radio Frequency Identification) (Passive or Active) or GPS devices.

Further, controller 500 (or package tracking device 400) includes communication module 608. The communication module 608 is configured to communicate with server 200. In the illustrated embodiment, communication module 608 is shown to include multiple means for communicating with server 200. For example, communication module 608 may include WIFI control 610 and WIFI antenna 612 associated therewith. Further, communication module 608 may include GSM (Global System for Mobile communications) Interface 614 and GSM antenna 616 associated therewith. It may be understood that GSM Interface 614 may work with a SIM card or the like provided therewith. Herein, GSM Interface 614 is implemented for text and data communication. Further, communication module 608 may include Bluetooth® control 618 and WIFI antenna 612 associated therewith. The communication module 608 may employ GSM (Global System for Mobile communications), CDMA (Code Division Multiple Access), LTE (Long Term Evolution), EVDO (Evolution-Data Optimized), Wi-Fi (IEEE 802.11), WiMAX (IEEE 802.16), TDMA (Time Division Multiple Access), or SMS (Short Message Service) technologies or a combination thereof, for communication with server 200. As may be understood, such communication mediums have some unique identifier, for example, the SIM card to be used in GSM Interface 614 may have a unique IMEI number, or the WIFI antenna 612 may have a unique MAC address. Herein, such a unique identifier is used as a unique device identification number for communication module 608, and thereby package tracking device 400.

In general, communication module 608 may implement one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, or other wireless, digital or analog, interface or connection, mesh or Digi® networking.

In particular, communication module 608 is configured to send the location coordinates of the package tracking device 400, along with information about the unique device identification number thereof, to server 200. Communication module 608 may send such information using any one or more of WIFI Control 610 by connecting to a public WIFI or the like, GSM Interface 614 in the form of a text message or connecting to a cellular network (e.g., 3G network), and Bluetooth Control 618 by connecting to a Bluetooth mesh network or the like and from thereon to Internet. Herein, server 200 is configured to retrieve information about the package, including one or more of unique package identification numbers, sender details, recipient details, and package delivery site coordinates. The data transmissions from communication module 608 to server 200 (and vice-versa) typically occur in one of the continuous transmissions, "event" transmissions, timed sequence transmissions, and interrogated transmissions. For example, in continuous transmissions, communication module 608 transmits the data (such as location coordinates of package tracking device 400) in substantially real-time to server 200. Data reconstruction at server 200, or at a computer arranged in-network with, or in communication with, communication module 608, then proceeds to analyze the data for desired characteristics.

It may be contemplated by a person skilled in the art that server 200 may be in communication with a server (not shown) of the package sender via a backend API (Application Programming Interface) to retrieve such details. The backend API may include, for example, a server (e.g., a real server, or a virtual machine, or a machine running in a cloud infrastructure as a service), or multiple servers networked together, exposing at least one API to the client(s) accessing it. These servers may include components such as application servers (e.g., software servers), depending upon what other components are included, such as a caching layer, or database layers, or other components. A backend API may, for example, include many such applications, each of which communicates with one another using their public APIs. In some embodiments, the API backend may hold the bulk of the user data and offer the user management capabilities, leaving the clients to have a very limited state. The backend API may further include one or more services (also referred to as network services). A network service is an application that provides data storage, manipulation, presentation, communication, and/or other capabilities. Network services are often implemented using a client-server architecture based on application layer network protocols. Each service may be provided by a server component running on one or more computers (such as a dedicated server computer offering multiple services) and accessed via a network by client components running on other devices. However, the client and server components can both be run on the same machine. Clients and servers may have a user interface and sometimes other hardware associated with them.

Herein, an API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate the integration of new features into existing applications (a so-called "plug-in API"). An API can also assist otherwise distinct applications with sharing data, which can help to integrate and enhance the functionalities of the applications.

Server 200 is further configured to link the unique package identification number of the package with the unique device identification number of package tracking device 400 associated therewith. It may be understood that when package tracking device 400 is being attached to or physically associated with the package, both the package and package tracking device 400, generally at a site of the sender, may be scanned one after the other. Server 200 may then link the two consecutively scanned unique package identification number of the package and the unique device identification number of package tracking device 400 with each other. Further, it may be understood that at this time, the other information about the package, including sender details, recipient details, and package delivery site coordinates, may be uploaded to server 200 by the sender via the backend API as discussed.

Referring again to FIG. 6, controller 500 (or package tracking device 400) includes motion-sensing module 622. Motion sensing module 622 is configured to detect the motion of package tracking device 400. Herein, motion-sensing module 622 includes a motion sensor 624. The motion sensor 624 may be any motion-detecting device as known in the art, such as but not limited to one or more accelerometers, magnetometers, and/or gyroscopes. In one example, motion sensor 624 may be integrated within controller 500, for example, as a solid-state accelerometer (e.g., using MEM technology). However, motion sensor 624 can be a stand-alone element such as a piezoelectric strip, strain gauge, force-sensing resistor, weight sensor, and the like without any limitations. In a later case, motion-sensing module 622 includes general-purpose input/output (GPIO) 626 to pass signals related to the determined motion of package tracking device 400 to processor 600 of controller 500 for processing thereof (as discussed later). Herein, GPIO 626 is a digital signal pin on an integrated circuit or electronic circuit board whose behavior, including whether it acts as input or output, is controllable at run time. Such interface is well known in the art and thus has not been described herein for the brevity of the present disclosure. Motion-sensing module 622 is used to detect a change in movement, direction, speed, and/or orientation of package tracking device 400, and such information may, in turn, be used to detect possible theft of the package. For example, when the package has been delivered and is left still for a while, and after some duration of time the package has been moved; in such case, by detecting the motion of the package using motion-sensing module 622, it may be deduced that the motion event may be due to possible theft of the package.

Further, as illustrated, package tracking device 400 (or controller 500) includes speaker module 628. In particular, speaker module 628 includes speaker driver 630 and speaker 632 connected thereto. In the present examples, speaker driver 630 is a piezo driver, and the corresponding speaker 632 is a piezo speaker, as known in the art. Speaker module 628 includes GPIO 634 to connect speaker driver 630 to processor 600 for receiving inputs therefrom, such as input indicative of possible theft. Speaker module 628 is configured to generate a loud sound on receipt of such input to alert the recipient or person in the vicinity about an event of possible theft and may possibly also scare off the thief to prevent package theft. Speaker module 628 may also be implemented for generating audible commands for controlling home automation and/or security systems. In some examples, package tracking device 400 (or controller 500) also includes microphone module 636. In particular, microphone module 636 includes microphone 638, as known in the art. Microphone module 636 also includes an analog-to-digital converter (A/D) 640 to convert the analog signals from microphone 638 and to be transmitted to processor 600 in controller 500. Microphone 638 is utilized for vocal recognition (using known techniques in art which are beyond the scope of the present disclosure, and thus not explained herein) for disarming package tracking device 400 using voice commands, for example, using a predefined voice code or the like. In some examples, package tracking device 400 (or controller 500) further includes dye pack module 642, having trigger 644 associated with a dye pack (not shown). Herein, trigger 644, when activated, causes the dye to be released from the dye pack. Dye pack module 642 further includes GPIO 646 to connect trigger 644 to processor 600 for receiving inputs about activation therefrom. Such design for releasing of dye from the dye pack may be contemplated by a person skilled in the art and thus has not been explained herein. Dye pack module 642 acts as an additional deterrent for scaring a thief in case of possible theft.

As discussed, the package tracking device 400 is implemented to prevent theft of the package. Further, as discussed, the standard package delivery process is for the delivery person to simply leave the package on the consumer's porch so the thieves could simply grab packages lying on the porches or the like. In order to prevent package theft, it may be necessary for the recipient of the package to be able to track the package and get notified if the package has been removed from the intended delivery site (like the porch) without his/her permission. According to embodiments of the present disclosure, system 100 with server 200 and package tracking device 400 enables to achieve such functionality. With package tracking device 400 is physically associated with the package and server 200 having linked the unique package identification number of the package with the unique device identification number of package tracking device 400, it is possible to track the package by indirectly tracking package tracking device 400 (associated therewith) as enabled by the location determination module 602 and communication module 608 therein.

Now, since the delivery site coordinates for the package may already have been retrieved by server 200, a virtual geofence could be formed over the delivery site coordinates, and when a thief may try to move the delivered package (from within the delivery site coordinates) outside of the geofence, an event could be triggered to inform the recipient about a possible theft of the package. In one example, the geofence may be an area (e.g., a circular area) defined with the radius being a predefined distance threshold from the package delivery site coordinates. In an example, the predefined distance threshold may be provided by the recipient, for instance, based on an area of the property (e.g., area of front porch, or distance between front porch and main gate) where the package is to be delivered or the like. In some examples, the predefined distance threshold may be set to a default value, such as 50 meters, from the package delivery site coordinates in case not being set by the recipient. The details about how the recipient may be able to set the package delivery site coordinates have been provided later in the description.

According to embodiments of the present disclosure, at least one of server 200 and controller 500 is configured to perform the steps for tracking the movement of the package to prevent theft of the package. It may be appreciated that in controller 500, the processing required for performing such steps may be provided by processor 600 therein. For the purposes of the present disclosure, server 200 and/or controller 500 is configured to generate an arm signal when the location coordinates of the package tracking device 400 are within a range of a predefined distance threshold (also referred to as geofencing) from the package delivery site coordinates. As discussed, the location coordinates of the package tracking device 400 are provided by the location determination module 602 to be transmitted to processor 600 and to server 200 (if required) via communication module 608. Herein, the arm signal indicates that the package has been delivered. Typically, the recipient may receive a message from the sender when the package is delivered by its delivery personnel. In the present embodiments, server 200 may be configured to send a notification to the recipient about package delivery upon generation of the arm signal to confirm that the package has been delivered. The server 200 and/or controller is configured to generate a first signal when any movement of the package is detected after the package is dropped at the destination address. The package tracking device may consider that the package is dropped to the destination address when the arm signal is generated, and the package remains at a single location for more than a threshold period of time. In an embodiment, the arm signal is generated by server 200, on receipt of delivery confirmation. In an embodiment, the arm signal is generated automatically when the package tracking device enters within the geofencing. The arm signal can also be generated manually by pressing an arm mode activation button (not shown in figures). Once the arm signal is generated, the location determination module 602 starts operating in a passive mode. In passive mode, the location determination module 602 may determine and share the location information with the server at a first frequency. The first frequency at which the location information is shared from the location determination module 602 with the server 200 can be configured by the user through an interactive application interface. The location determination module 602 operates in passive tracking mode to minimize the usage of the battery.

Further, server 200 and/or controller 500 is configured to generate a second signal when the location coordinates of the package tracking device 400 are outside of the range of a predefined distance threshold from the package delivery site coordinate post generation of the first signal. Herein, the second signal indicates a possible theft event since it indicates once the package has been delivered, it has now been moved outside of the geofence (which is defined based on the predefined distance threshold from the package delivery site coordinates). On the generation of the second signal, the location determination module 602 starts operating in active tracking mode, in which the location determination module 602 determines and shares live location information at a second frequency that is higher than the first frequency. In an embodiment, the second frequency at which the location information is shared with the server 200 can be configured by the user through the interactive application interface. The location determination module 602, operating in active tracking mode, may continuously share the live location information with the server.

Further, server 200 and/or controller 500 is configured to alert the recipient of the package, based on the recipient details, upon generation of the second signal. That is, when it is determined that there is a possible theft of the package, the recipient is notified about the same. For this purpose, server 200 may send such notification to the recipient via a communication network (such as network 14, 18 of FIG. 1) or any known communication means (e.g., Internet), in the form of mobile notification (via a user application installed on a smartphone of the recipient, as discussed later), SMS, automated voice call, instant message, email or the like. In the case of controller 500, the notification may be sent to the recipient via communication module 608 therein. In an example, communication module 608 may send the notification in the form of SMS via GSM Interface 614 provided therein. In an example, communication module 608 may be connected to a Public WIFI or a recipient's WIFI (with WIFI credentials already provided by the recipient) to send the said notification in the form of mobile notification, instant message, email, or the like.

As discussed, the electronic components of package tracking device 400 are powered by battery 502. Due to the size constraints of package tracking device 400, battery 502 can only be of limited size and thus limited capacity. Since it may take days, or even up to months, for the package once left from the sender site to be delivered at the recipient address, it may be prudent to save the charge of battery 502 during such transit period. It may be appreciated that location determination module 602 may need not be activated during the transit period, as the need to track the package for determining possible theft is only required after the package has been delivered. Similarly, communication module 608 and motion sensing module 622 need to be activated after the package has been delivered, which otherwise may drain the charge of battery 502.

In an embodiment, server 200 is configured to retrieve information about the delivery of the package based on the sender details. As discussed, server 200 may retrieve such details via the backend API through the server of the sender. Server 200 is further configured to generate an arm signal upon confirmation of the package being delivered. Herein, controller 500 is configured to control location determination module 602 to initiate determination of the location coordinates of package tracking device 400 upon generation of the arm signal. That is, location determination module 602 may only be activated once the package is confirmed to have been delivered. This is done so, as discussed, in order to conserve the charge of battery 502 for the longer operation of package tracking device 400. In an embodiment, the controller 500 is configured to activate motion sensing module 622 upon generation of the arm signal such that motion sensing module 622, when activated, is configured to generate a motion signal upon detection of the motion of package tracking device 400. Further, controller 500 is configured to control location determination module 602 to initiate active tracking mode for determination of the location coordinates of package tracking device 400 upon generation of the motion signal (also referred to as first signal). That is, location determination module 602 may only be activated once the package has been moved after being delivered. Again, this is done so, as discussed, in order to conserve the charge of battery 502 for the longer operation of package tracking device 400. It may be appreciated that although the claimed embodiment has been described in terms of activation of location determination module 602, other modules of the package tracking device 400 may similarly be configured to activate once the package has been delivered and armed.

In some embodiment, the location determination module 602 initiates active tracking mode on receipt of the first signal. The first signal is generated by either the motion detection module, which may be an optional component of the package tracking device, or by the location determination module 602 operating in the passive tracking mode. The first signal is generated by the location determination module 602 when a change in location based on the passive tracking is detected.

Figure 7:
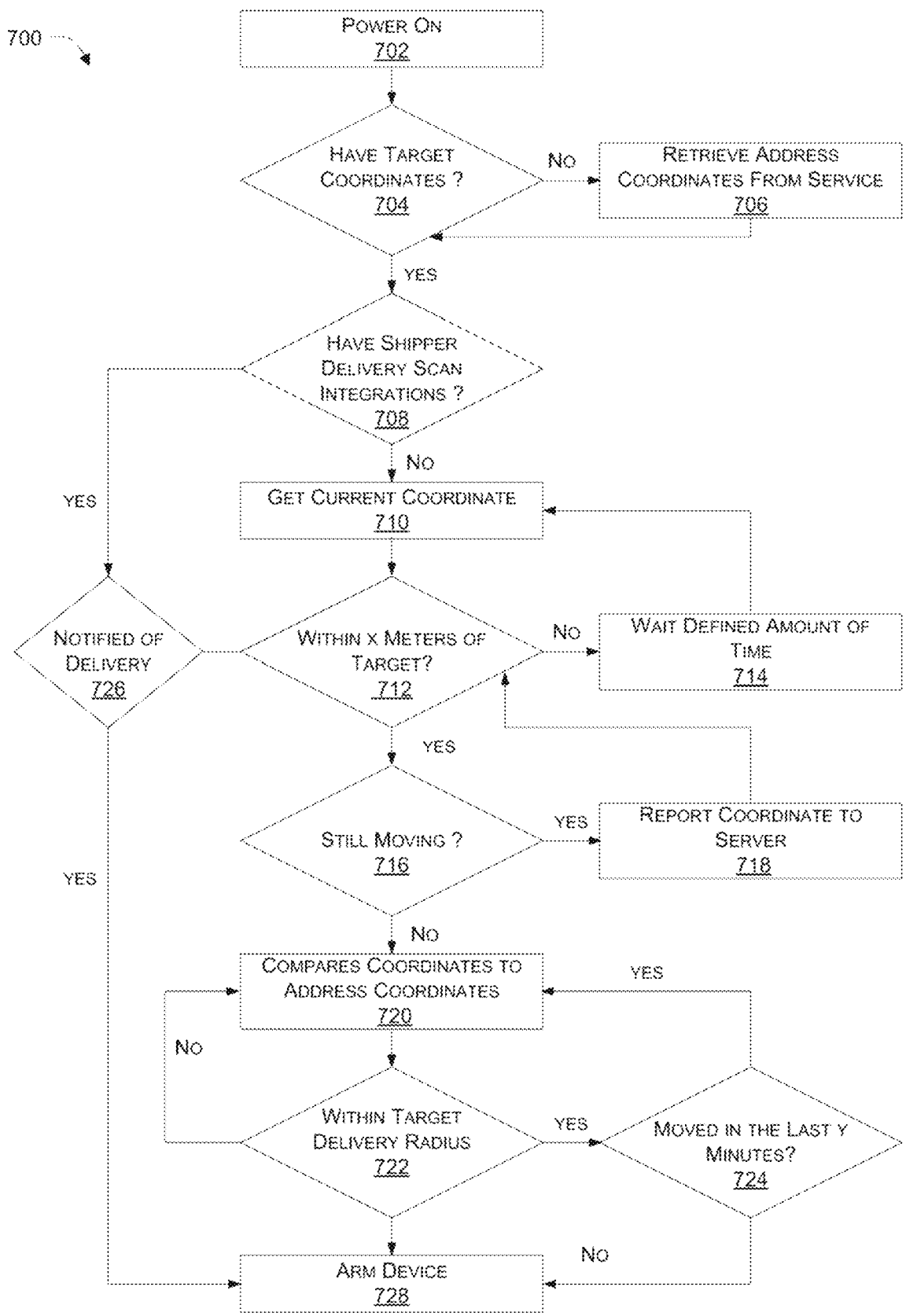
FIG. 7 illustrates a flowchart depicting steps involved in arming of the package tracking device, in accordance with one or more exemplary embodiments of the present disclosure.

Referring now to FIG. 7, illustrated is flowchart 700 depicting steps involved in arming of package tracking device 400, in accordance with one or more exemplary embodiments of the present disclosure. At step 702, package tracking device 400 is powered on. At step 704, it is checked whether server 200 has package delivery site coordinates. If NO, at step 706, the package delivery site coordinates are retrieved. If YES, at step 708, it is checked whether server 200 may able to retrieve delivery confirmation from the sender. If YES, the process moves to step 726. If NO, at step 710, the location determination module 602 determines the current location coordinates of package tracking device 400. At step 712, it is checked whether package tracking device 400 is within the range of predefined threshold distance from the package delivery site coordinates. If NO, at step 714, after waiting for a predefined time, the process again executes step 710. And if YES, at step 716, it is determined if package tracking device 400 is moving based on the change in location coordinates thereof and/or based on the determination of motion sensing module 622. If YES, at step 718, the location coordinates of the package tracking device 400 are reported to server 200 to enable tracking thereof. If NO, at step 720, the location coordinates of package tracking device 400 are compared to the package delivery site coordinates. Further, at step 722, it is determined that if the location coordinates of package tracking device 400 are within the range of the predefined distance threshold from the package delivery site coordinates. If NO, the process moves back to step 720. If YES, at step 724, it is determined if package tracking device 400 has moved within the last predefined amount of time (e.g., 5 minutes). If YES, the process moves back to step 720. If NO, package tracking device 400 is armed at step 728. Further, at step 726, it is checked if, herein, server 200 is notified of delivery (by the server of the sender). If NO, the process moves back to step 712. If YES, package tracking device 400 is armed at step 728. It may thus be understood that package tracking device 400 may generally be disposed of in a "sleep" state, and this way, the components of the package tracking device 400 may be controlled to be activated only when needed, thus conserving the charge of battery 502 therein.

In the event the package remains on the delivery premises, i.e., within the range of the predefined distance threshold from the package delivery site coordinates, after a set amount of time, it may be assumed that the package may not be in danger of theft. For instance, the package with the package tracking device 400 may have been delivered outside of the home and then taken inside of the home by the intended recipient, all the while staying within the range of the predefined distance threshold from the package delivery site coordinates. In such a case, it may be required to disarm package tracking device 400 to avoid any false alarms. For this purpose, server 200 and/or controller 500 may send a notification to the recipient to verify if the recipient has obtained the package. In an example, the notification may be in the form of a mobile notification with a simple YES and NO option to be tapped by the recipient for providing the said confirmation. If the recipient confirms (e.g., by tapping on the YES button in the said mobile notification), the package tracking device 400 is disarmed. In the present embodiments, the recipient may have the option to disarm package tracking device 400 at any given moment by using the user application (as discussed later), by accessing server 200 using given credentials, or the like.

As discussed, determination of the location coordinates of package tracking device 400 by the location determination module 602 consumes a charge of battery 502 and thus needs to be optimized. Further, as would be known, the package may stay placed at, say, the porch of the recipient for a while (e.g., if the recipient was not at home when the package was delivered) before being picked up by the recipient. It may be appreciated that while the package is at the porch, it may be not be required to continuously track the package, and thus acceptable to operate location determination module 602 at a reduced frequency, which, in turn, saves battery. However, if it has been determined that there is a possible theft of the package, then it may be required to continuously track the package in order to get updated information about the current location of the package, even at the cost of the battery. In an embodiment, controller 500 is configured to control location determination module 602 to determine location coordinates of package tracking device 400 at a first frequency upon generation of the first signal and at a second frequency upon generation of the second signal, with the second frequency being higher than the first frequency. That is, with the generation of the first signal (i.e., confirmation of delivery), a location determination module 602 is operated at a lower (first) frequency, and with the generation of the second signal (i.e., determination of possible theft), the location determination module 602 is operated at a higher (second) frequency.

In a further embodiment, the second frequency is defined based on a preset condition including at least one of a preset time interval and a preset distance interval from the outside of the predefined distance threshold from the package delivery site coordinates. Herein, the preset time interval represents an amount of time that has lapsed post generation of the second signal, and the preset distance interval represents a distance traveled by package tracking device 400 post generation of the second signal. In an exemplary configuration, the preset time interval may be 10 seconds. That is, after 10 seconds of the generation of the second signal if package tracking device 400 is still not within the defined geofence (in addition, that package tracking device 400 is armed/not disarmed), the frequency at which location determination module 602 determines the location coordinates of the package tracking device 400 is increased from the first frequency to the second frequency. In some cases, after every passing preset time interval, an absolute value of the second frequency is increased (up to a certain limit). Similarly, in an exemplary configuration, the preset distance interval may be 50 meters. That is, after 50 meters of the distance traversed by package tracking device 400 moving away from the package delivery site coordinates, after generation of the second signal (and if package tracking device 400 is armed/not disarmed), the frequency at which location determination module 602 determines the location coordinates of the package tracking device 400 is increased from the first frequency to the second frequency. In some cases, after every further preset distance interval traversed by package tracking device 400 moving away from the package delivery site coordinates, the absolute value of the second frequency is increased (up to a certain limit).

Figure 8:
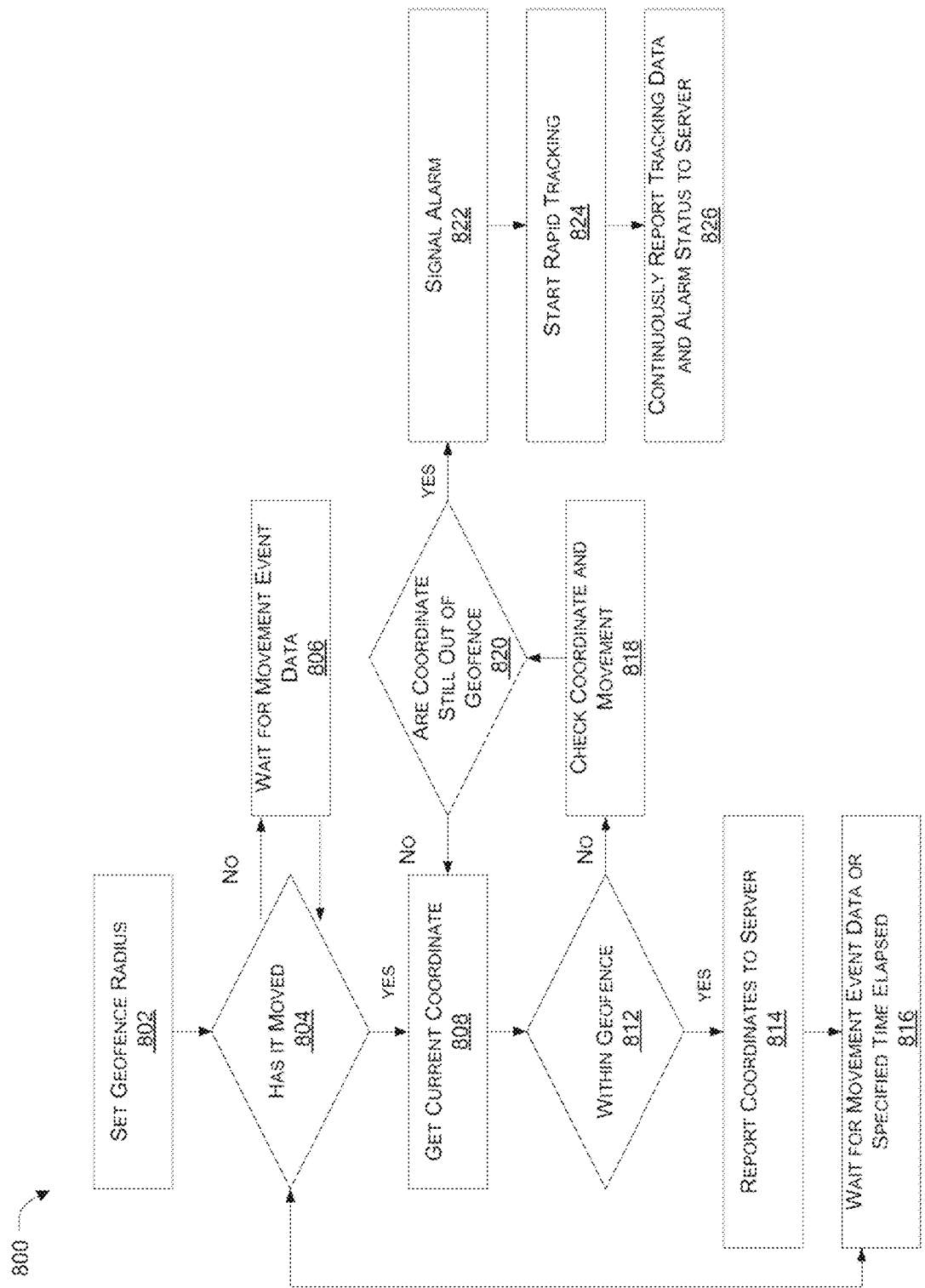
FIG. 8 illustrates a flowchart depicting steps involved in the tracking of the package tracking device, in accordance with one or more exemplary embodiments of the present disclosure.

Referring now to FIG. 8, illustrated is a flowchart 800 depicting steps involved in the tracking of package tracking device 400, in accordance with one or more exemplary embodiments of the present disclosure. At step 802, the predefined distance threshold is defined. At step 804, it is determined if package tracking device 400 has moved based on the generation of any motion signal by motion-sensing module 622. If NO, at step 806, the process waits for the generation of the motion signal. If YES, at step 808, the location determination module 602 is instructed to determine the location coordinates of package tracking device 400. Further, at step 812, it is determined if the location coordinates of package tracking device 400 are within the range of the predefined distance threshold from the package delivery site coordinates. If YES, the process moves to step 814, at which the location coordinates are reported to server 200 and then to step 816, at which the process waits for a specified time to be lapsed to again execute step 804. If NO, at step 818, location coordinates and the movement of the package tracking device 400 are again checked. At step 820, it is confirmed if the location coordinates of the package tracking device 400 are still outside of the range of the predefined distance threshold from the package delivery site coordinates. If NO, the process moves back to step 808. If YES, at step 822, the alert is generated for the recipient. Further, at step 824, the location determination module 602 is instructed to operate at the second frequency. Further, at step 826, the location coordinates (as determined by location determination module 602 at the second frequency) are constantly reported back to server 200. This way, the operation of the package tracking device 400 may be optimized to have a good balance of battery life and tracking efficiency.

Figure 9:
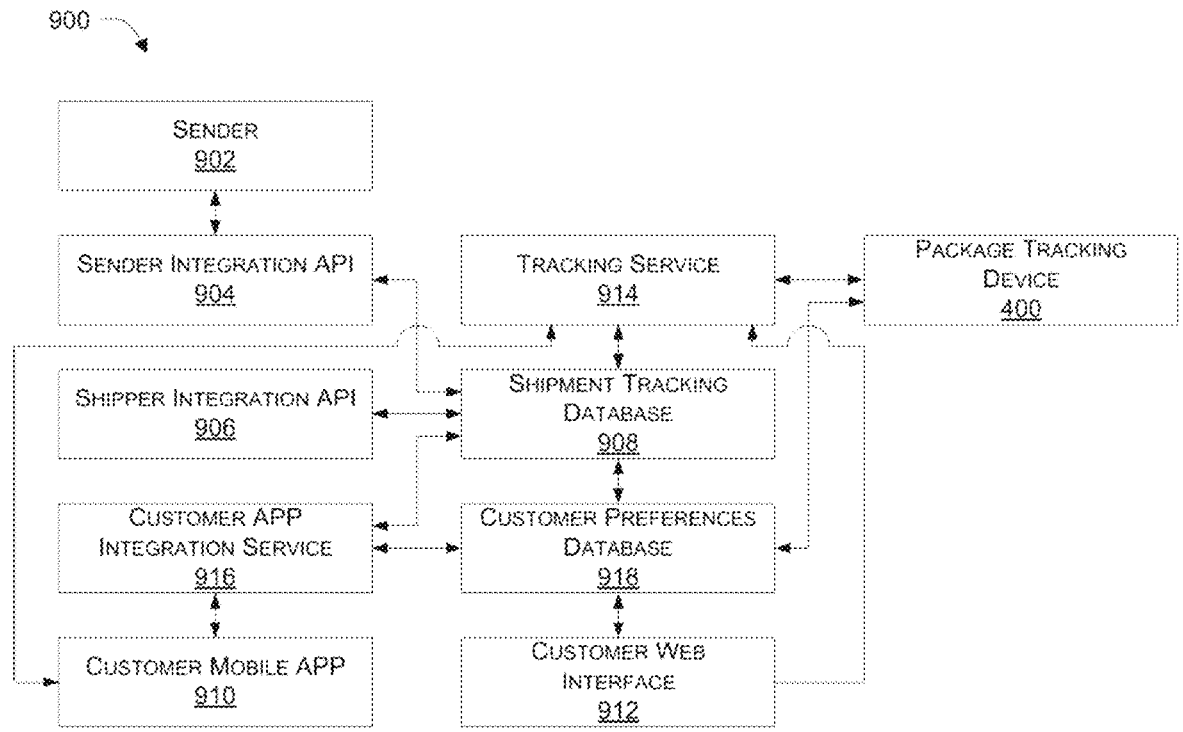
FIG. 9 illustrates a schematic block diagram depicting process flow for facilitating communication between server and package tracking device, in accordance with one or more exemplary embodiments of the present disclosure.

Referring now to FIG. 9, illustrated is a block diagram depicting process flow 900 for facilitating communication between server 200 and package tracking device 400, in accordance with one or more exemplary embodiments of the present disclosure. Herein, a sender (as represented by block 902) of the package provides a sender integration API (as represented by block 904) to allow other devices to retrieve information about the package, including unique package identification number, sender details, recipient details, and package delivery site coordinates. Further, the shipper (not shown) of the package responsible for shipping the package from the sender (i.e., sender warehouse or the like) to the recipient (i.e., to package delivery site coordinates) provides a shipper integration API (as represented by block 906), which is in communication with a shipment tracking database (as represented by block 908). Shipment tracking database 908 may be a cloud-based database to be accessed by third parties and is updated by the sender via shipper Integration API 906. For instance, sender 902 may retrieve the current shipment status of all shipped packages through a particular shipper via its sender integration API 904 in communication with the corresponding shipment tracking database 908. The recipient may be allowed to access information related to the package via customer mobile app 910 and/or customer web interface 912, which are also in communication with tracking service 914 provided with package tracking device 400. It may be appreciated that in some examples, shipment tracking database 908 may determine the current location of the package using tracking service 914. Further, herein, customer mobile app 910 provides customer app integration service 916 to allow the customer (recipient) to, for instance, access shipment tracking database 908 for checking shipping status of the package ordered thereby and thus assigned thereto. Customer web interface 912 allows the customer (recipient) to change preference related to package tracking device 400 (or multiple package tracking devices 400 associated therewith), for example, when to arm, auto-alert, and the like (as also discussed in more detail later in the description) by updating customer preferences database 918. It may be appreciated that such customer web interface 912 may be integrated into customer mobile app 910 itself without any limitations.

Figure 10:
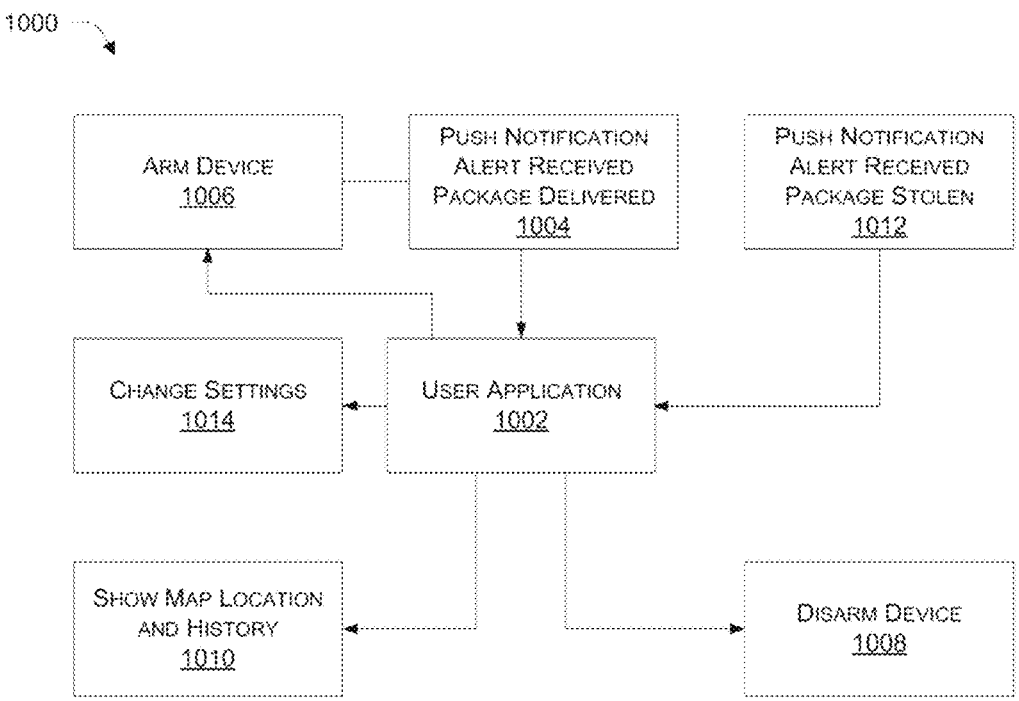
FIG. 10 illustrates a schematic block diagram depicting the functioning of a user application for a recipient of the package, in accordance with one or more exemplary embodiments of the present disclosure.

Referring to FIG. 10, illustrated is a schematic block diagram depicting process flow 1000 representing functioning of user application 1002 for the recipient of the package, in accordance with one or more exemplary embodiments of the present disclosure. As illustrated, when the package is delivered, a push notification (as represented by block 1004) is generated to confirm the same and sent to user application 1002 to notify the recipient (as depicted). Further, based on the generation of push notification 1004, package tracking device 400 is automatically armed (as represented by block 1006). As may be seen, the user application 1002 also allows to arm package tracking device 400 manually (as shown in FIG. 10). Furthermore, user application 1002 allows disarming package tracking device 400 (as represented by block 1008) manually if required. User application 1002 further allows the recipient to track package tracking device 400 and thereby the package (as represented by block 1010). Further, as illustrated, when it is determined that there is a possible theft of the package, a push notification is generated (as represented by block 1012) to confirm the same and sent to the user application 1002 to notify the recipient (as depicted). Furthermore, user application 1002 allows the recipient to change the settings of the package tracking device 400, such as whether to automatically arm the package tracking device 400 or not, setting the predefined distance threshold, and the like (as discussed in the preceding paragraphs).

In an embodiment, controller 500 is configured to activate speaker module 628 to generate an alarm sound upon the generation of the second signal, i.e., when the possible theft of the package is determined. Speaker module 628 is used to generate an alarm to possibly scare the thief and also alert the recipient or any other person in the vicinity of the possible theft of the package. In an embodiment, controller 500 is configured to activate microphone module 636 to record sound upon generation of the second signal, i.e., when the possible theft of the package is determined, microphone module 636 is used to record sound and send to server 200 via communication module 608, which may contain voice samples of the thief, and which in turn may be used as evidence for pressing charges. In an embodiment, controller 500 is configured to activate trigger 644 for releasing of dye from the dye pack (not shown) upon generation of the second signal. That is, when the possible theft of the package is determined, trigger 644 is activated to cause the dye pack to burst or the like and spread the dye over the person trying to steal the package. This may be useful to possibly scare the thief to leave the package behind. In some examples, server 200 and/or controller 500 (via Bluetooth control 618, for instance) may be configured to be associated with a home automation system of the recipient (using some API and shared credentials) to notify the user about various events related to the package through electronic components inside the home of the user. For example, the recipient may be notified of delivery of the package by turning smart light(s) at home to GREEN color and/or be notified of possible theft of package by turning smart light(s) at home to RED (or blocking RED) color. This may be helpful as the recipient may be immediately notified even if the smartphone of the recipient may not be handy with him/her at a given moment of receiving the notification.

FIGS. 11 to 15 illustrate different graphical user interfaces (GUIs) of user application 1002 for providing different functionalities to the recipient related to package theft prevention. Herein, the "user application" is used to describe an application that runs or is executable on an electronic device, such as a smartphone, tablet, or another portable mobile device. User application 1002 is adapted to be installed on a user device (such as user device 42) of the recipient of the package. User application 1002 is configured to establish communication with server 200. Herein, the recipient of the package may be a registered user of user application 1002. The term "registered user of user application" (termed hereafter as "registered user" or "user") means that the user has a profile registered within or by user application 1002 and stored in the user device, wherein said profile includes information which may include one or more of: the user's user name, and, optionally, the user's home address. By means of user application 1002, multiple packages tracking devices 400 may be registered to a single user so that the user may track and safeguard all the packages to which those package tracking devices 400 may be associated. In an example, the user may purchase several package tracking devices 400 from a service provider, and that service provider may associate one of those package tracking devices 400 to each package to be delivered to that user. Further, after the package has been received by the user, the corresponding package tracking device 400 may be returned to that service provider to be reused. It may be appreciated that it is not necessary that single package tracking device 400 may permanently be assigned to a single user. Since each package tracking device 400 has a unique device identification number, it may be possible to simply assign one of the unique device identification numbers with the corresponding package tracking device 400 for catering to the delivery of a particular package to that used for a given order.

The GUIs allow users to perform different settings for the package tracking device through a remote computer or a user device. Global settings provide options to perform the initial set-up for the application. One can define a tracker name and associate a unique identifier (e.g., IMEI number) for the tracker. For each package tracking device, the appropriate setting can be performed by the user. The GUI may be configured to provide information with respect to whether the package tracking device is currently active or not active. The GUIs may display delivery data (expected delivery date if the package is not delivered or actual delivery date if the package is delivered). The GUIs allows user to define the first frequency and the second frequency at which location information needs to be shared with the server or user device. For example, the user can define the location refresh rate (first frequency) to be one ping per second. The user can also define if they want auto alert or manual alert and whether they want to automatically or manually activate the arm mode. Users can also set their preference to see either a full map with directions from the delivery location or just the location of the unit.

In some embodiment, the setting with respect to whether the package tracking device should automatically generate the arm signal on entering the geofencing or on confirmation of delivery by a delivery person (who can scan the package to confirm the delivery). The GUIs provide the interface to users to define the delivery location on a map and associate a geofencing with the delivery location. A default geofencing is defined as a fixed-length range from the delivery location. The user can adjust the geofencing by increasing or decreasing the distance from the delivery location. The GUIs allow users to list accounts with each package and add details of a person who should receive notification or alert. In an embodiment, the GUIs allows user to add details of the home automation system and smart assistance devices to which the alert can be pushed. A user can also define a preferred communication medium (SMS, email, social media feed, instant message, call, etc.) for sending alerts/notifications. The user can also set a template and select from a list of a template is populated with relevant information for sending the alerts.

Figure 11:
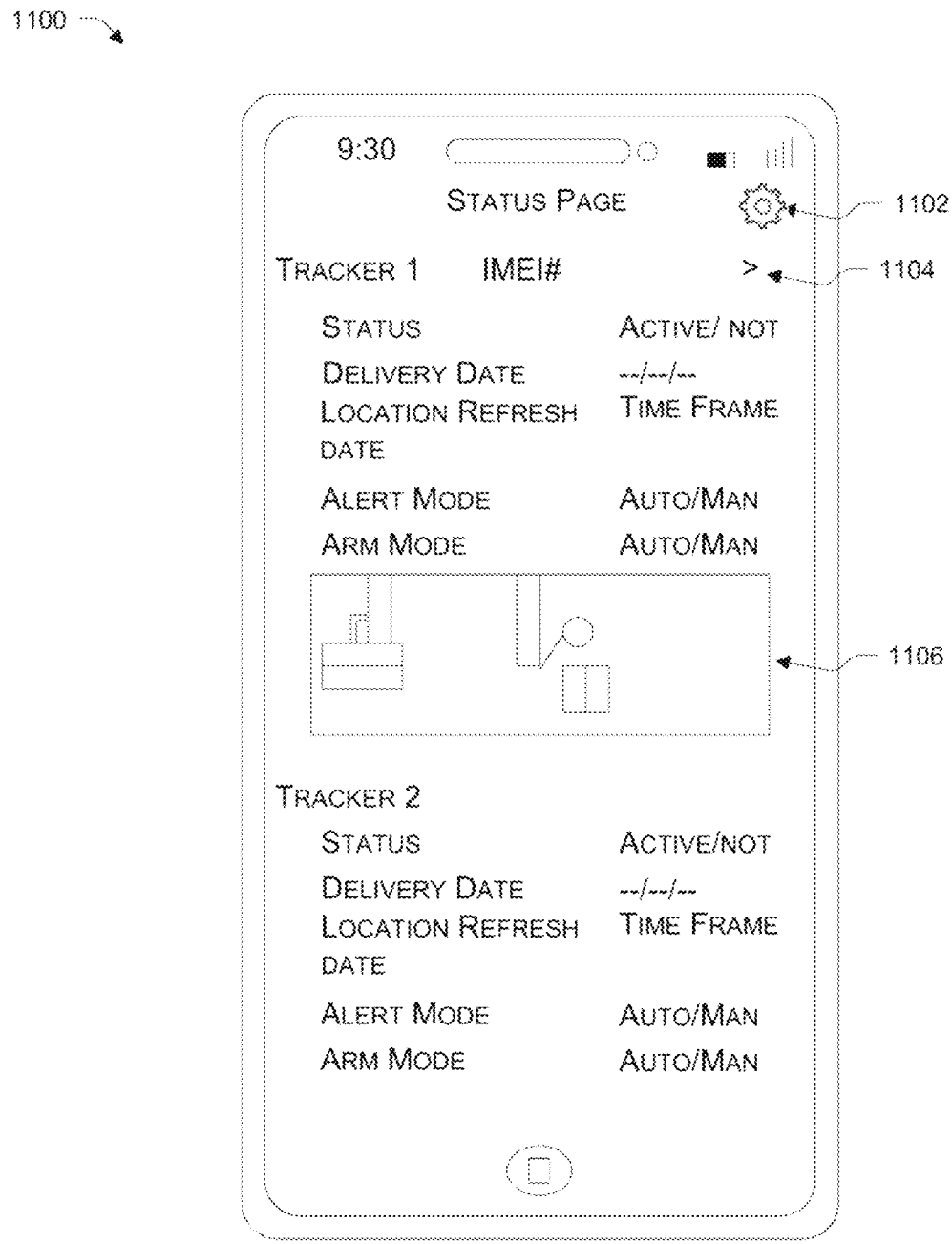
FIG. 11 illustrates a graphical user interface (GUI) of the user application to allow the recipient to monitor the status of the package tracking device, in accordance with one or more exemplary embodiments of the present disclosure.

Referring to FIG. 11, GUI 1100 is provided, which may represent a Home Page or a "Status Page" of user application 902 and may provide high-level information about package tracking devices 400 assigned to the user. GUI 1100 provides button 1102 to access the settings page of package tracking devices 400. GUI 1100 also provides button 1104 next to each listing of the package tracking device 400 to check details thereabout. GUI 1100 further provides map display 1106 corresponding to each package tracking device 400 displaying its latest known location coordinates thereon (if available). GUI 1100 further provides other information related to the status of package tracking devices 400, which may be understood from FIG. 11 by a person skilled in the art and thus has not been explained herein for the brevity of the present disclosure. The GUI can present a battery status update, tracker status (armed/not armed), a time stamp of delivery, and a map with live location information.

Figure 12:
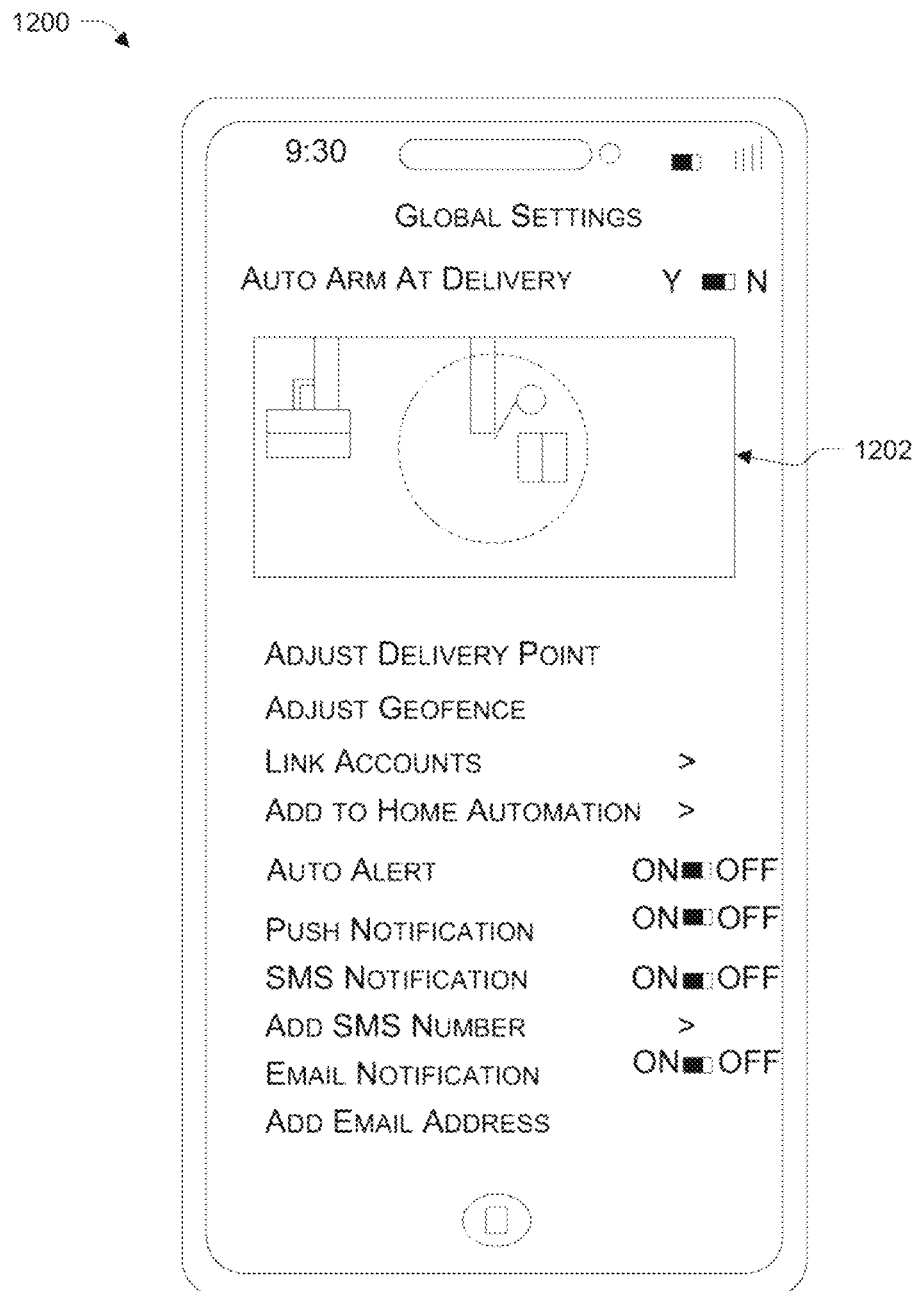
FIG. 12 illustrates a GUI of the user application to allow the recipient to control process related to package theft prevention, in accordance with one or more exemplary embodiments of the present disclosure.

Referring to FIG. 12, GUI 1200 is provided, which may represent a "Global Settings Page" of the user application

902. GUI 1200 allows changing settings of all the assigned package tracking devices 400 to the user at once. That is, the setting applied herein is applied to all the assigned package tracking devices 400 to the user, in contrast to changing the same setting individually for each package tracking device 400 assigned thereto (as achieved via button 1004 of FIG. 10). GUI 1200 further allows for changing various settings of package tracking devices 400, which may be understood from FIG. 12 by a person skilled in the art and thus has not been explained herein for the brevity of the present disclosure.

Figure 13:
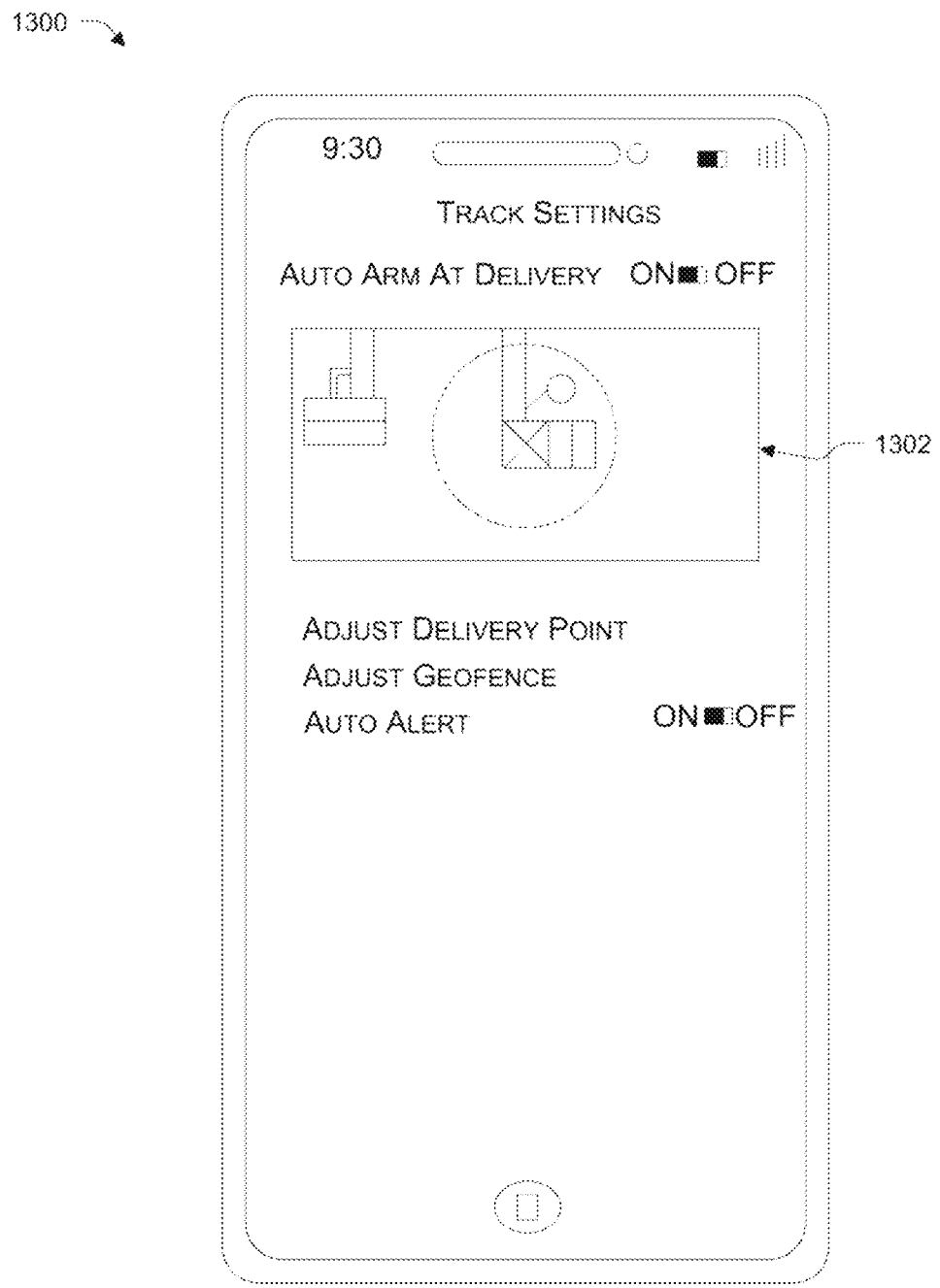
FIG. 13 illustrates a GUI of the user application to allow the recipient to control settings of the package tracking device, in accordance with one or more exemplary embodiments of the present disclosure.

Referring to FIG. 13, GUI 1300 is provided, which may represent an individual "Tracker Settings Page" of user application 902. GUI 1300 allows changing settings of any particular package tracking device 400 assigned to the user. Specifically, GUI 1300 allows defining the predefined threshold distance for a particular package tracking device 400, for example, by pinching in or out on map display 1302 or setting a numerical value (in meters or feet) using available options. GUI 1300 further allows for changing various settings of the corresponding package tracking device 400, which may be understood from FIG. 13 by a person skilled in the art and thus has not been explained herein for the brevity of the present disclosure.

Figure 14:
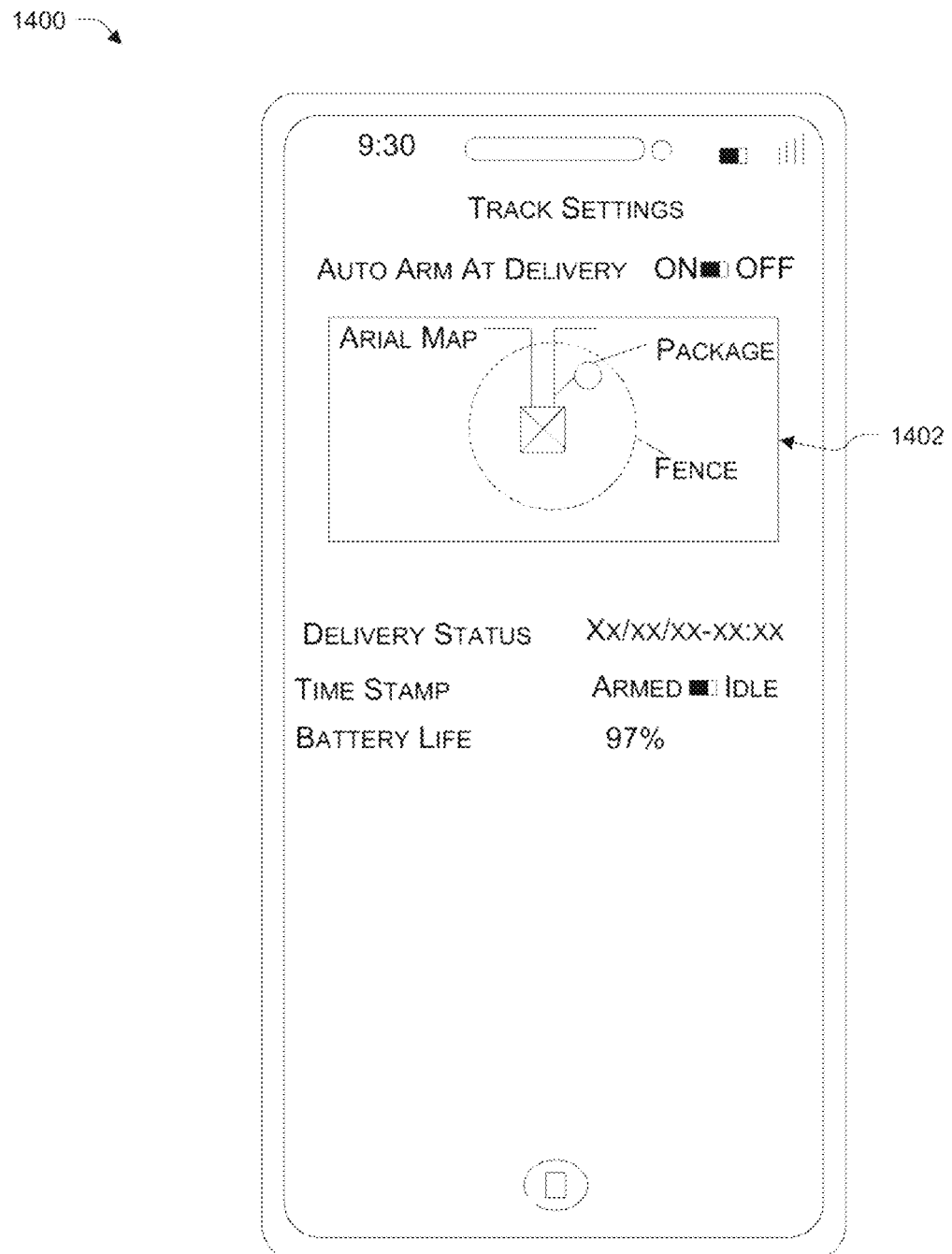
FIG. 14 illustrates a GUI of the user application to allow the recipient to monitor the status of the package having been delivered, in accordance with one or more exemplary embodiments of the present disclosure.

Referring to FIG. 14, GUI 1400 is provided, which may represent an individual "Delivery Info Page" of user application 902. GUI 1400 allows checking the delivery status of a particular package, including the current location via map display 1402, by checking this page for corresponding tracking device 400. GUI 1400 further allows checking other statuses of the corresponding package tracking device 400, which may be understood from FIG. 14 by a person skilled in the art and thus has not been explained herein for the brevity of the present disclosure.

Figure 15:
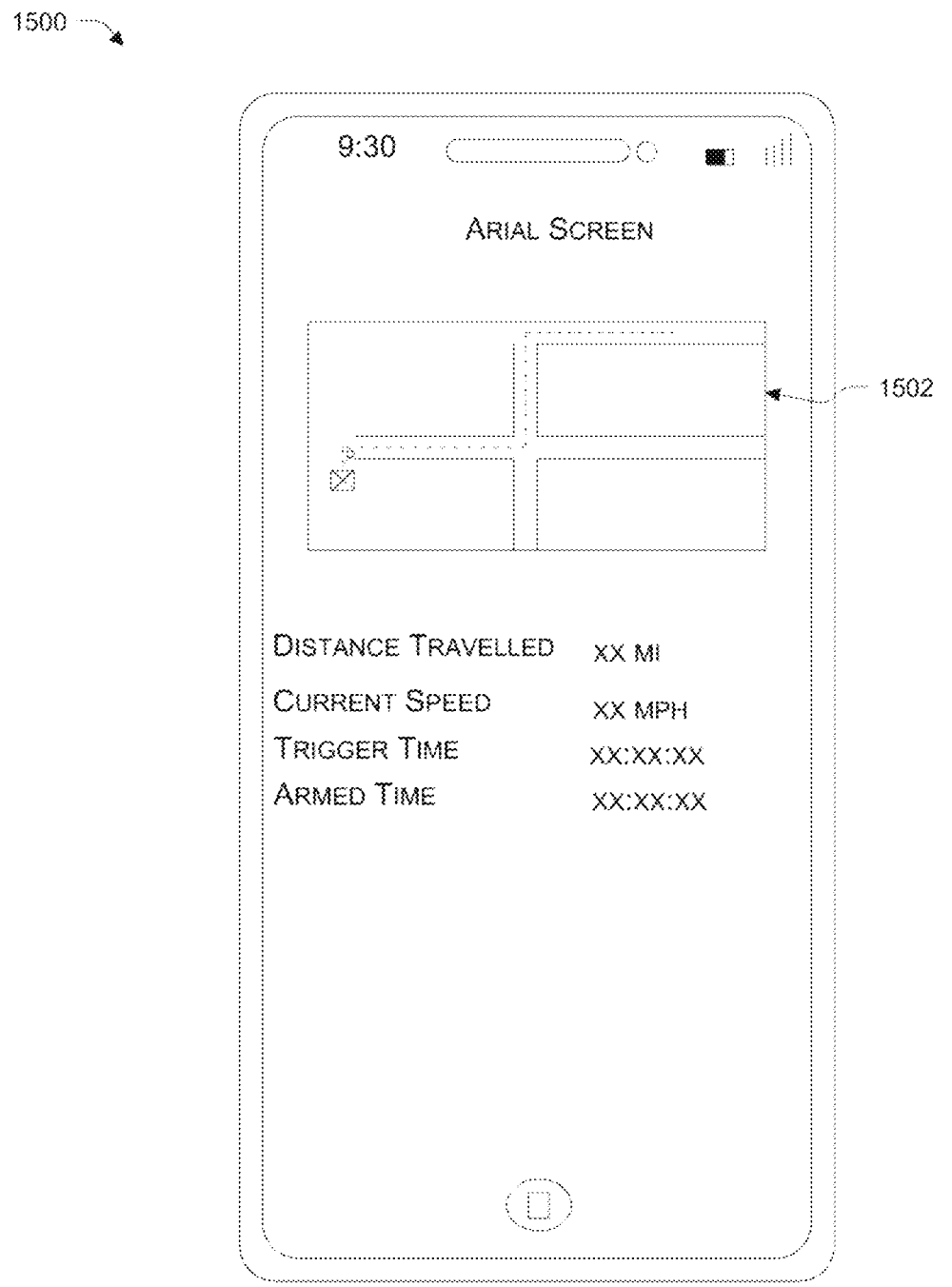
FIG. 15 illustrates a GUI of the user application to allow the recipient to monitor the status of the package having been stolen, in accordance with one or more exemplary embodiments of the present disclosure.

Referring to FIG. 15, GUI 1500 is provided, which may represent an "Aerial Screen Page" of user application 902. GUI 1500 allows monitoring a particular package in case of determination of possible theft thereof. GUI 1500 provides map display 1502 to show the current location of the corresponding package tracking device 400 and further indicates a path is taken (based on recent past location coordinates of the corresponding tracking device 400) by package tracking device 400. GUI 1500 further allows checking other statuses of corresponding package tracking device 400, like distance, traveled since the determination of possible theft, current speed, trigger time (time of determination of possible theft), etc. which may be understood from FIG. 15 by a person skilled in the art and thus has not been explained herein for the brevity of the present disclosure.

The GUIs can present an Arial map with a live location update of the package tracking device, distance travel from the delivery location, and speed at which the package tracking device is being moved. A user may set when he/she wants to receive an alert. The system allows a user to define custom rules to generate a custom alert.

Figure 17:
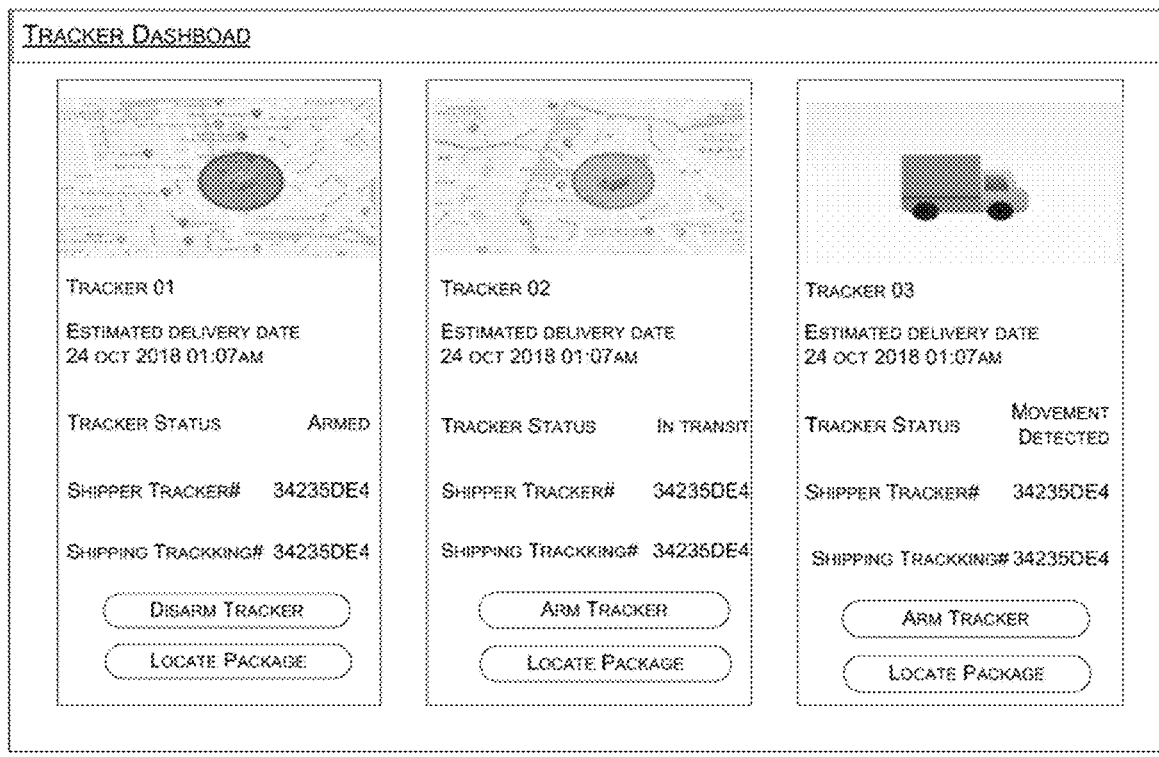
FIG. 17 illustrates an example application interface showing detailed tracking information along with location information of different packages tracked in accordance with one or more exemplary embodiment of the present disclosure.
Figure 18:
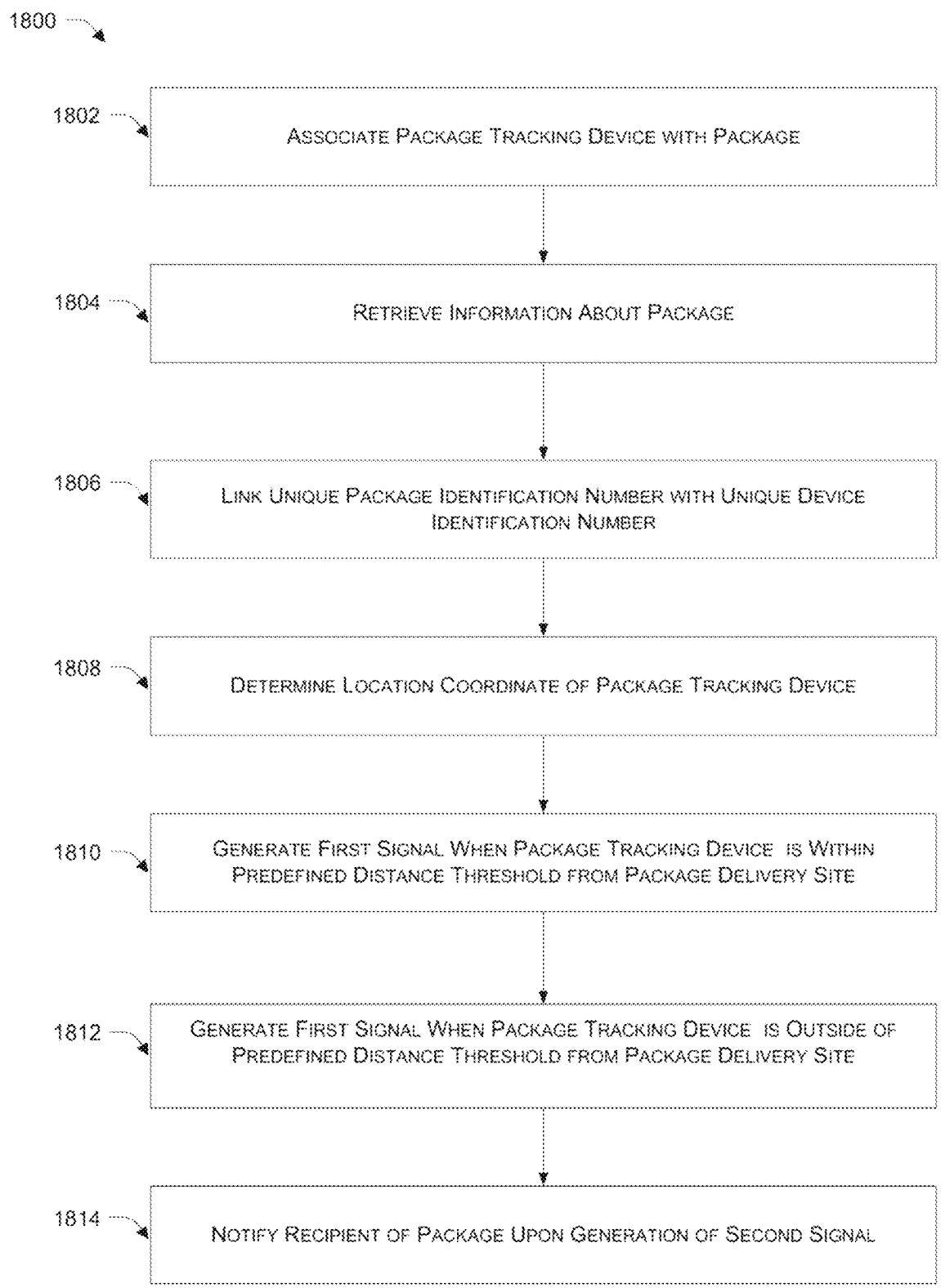
FIG. 18 illustrates a flowchart listing steps involved in a method for preventing theft of a package, in accordance with one or more exemplary embodiments of the present disclosure.

Referring to FIG. 16, GUI 1600 provides a list of shipments and their tracking status. A user may check the status of the packages again with each tracking number and action taken through a single interface. A user, through an interactive application, can check details of their shipped packages. In an embodiment, the list of packages may retain the tracking information for packages recently delivered to different destination addresses for which confirmation of the physical receipt of the package is not yet received. The GUI 1600 can be accessed by authorized users, who may have a sender, a receiver, a currier company representative, or an e-commerce representative. As one will appreciate, a sender who has ordered a product of themselves or for another receiver may track the shipment status of the package containing the product. A receiver may check the status of packages for which he/she is an intended receiver. The user may check details, such as tracker identification number, shipment number, delivery date, and status of the tracker. The GUI 1600 also provides options to the user to disarm a tracker, arm a tracker (send an arm signal), and report the status of the package to a third party, such as the intended receiver, a neighbor of the intended receiver, law enforcement agency, etc. GUI 1600 also provides options to check other details of the package and track live location information. FIG. 17 represents a GUI 1700 that provides a detailed view of each package being tracked. A user may see for each package having an attacked package tracking device, estimated delivery date/time, actual delivery date/time, tracker status (e.g., armed, in-transit, movement detected, alarm triggered, etc.). Users can be presented with an appropriate button to act. For example, for tracker 1, GUI 1700 may present an option to the user to disarm the tracker. Similarly, for tracker-2, the GUI 1700 may present an option to the user to arm the tracker-2 remotely and for tracker 3. The GUI 1700 provides an option to locate the tracker using a map interface and track the live location of the package. In an embodiment, when the user clicks to locate the package, an active tracking mode activation signal is sent to the package tracking device. On receiving the active tracking mode activation signal, the location tracking module of the package tracking device starts tracking the package actively, even if the package was in transit or in passive tracing mode. The user, through the GUI 1700, may select an option to put back the trackage tracking device to operate in the previous mode (e.g., passive tracking mode).

The present disclosure also relates to a method for deterring theft of a package as described above. A method for tracking the movement of a package is described. The method includes steps of associating a package with a package tracking device having a unique device identification number, associating a geofencing with a delivery address of the package, and activating, on receipt of an arm signal, the package tracking device to operate in a passive tracking mode, in which location updates are sent from the package tracking device to a remote computer at a first frequency. The method further includes steps of activating, on a generation of a second notification, the package tracking device to operate in an active tracking mode, in which location updates are sent from the package tracking device to a remote computer at a second frequency that is higher than the first frequency, wherein the second notification is generated when the package is moved outside the geofencing.

In some embodiments, the package tracking device receives the arm signal from the remote computer on confirmation of delivery of the package to the destination address. In an embodiment, the location information associated with the geo-fencing is stored in a local memory of the package tracking device, and the arm signal is auto-generated by the package tracking device when the package tracking device enters the geofencing. The geofencing is associated with the delivery address by a user through an application interface and is pushed to the package tracking device using the unique identification number.

The method further includes steps of generating and sending the first notification by the package tracking device when a movement of the package is detected. The movement of the package is detected by a motion-sensing module embedded with the package tracking device.

In an embodiment, the second notification is generated on a determination that the package is moved outside the geofencing. The determination that the package is moved outside the geofencing is done by a location determination module embedded in the package tracking device. The second notification is sent to a user device along with the location updates and other package information.

The method causes to generate a warning sound through a speaker attached with the package tracking device when the second notification is generated. The various embodiments and variants disclosed above apply mutatis mutandis to the method. Referring to FIG. 16, illustrated is flowchart 1600 listing steps involved in the method for deterring theft of a package, in accordance with one or more exemplary embodiments of the present disclosure. At step 1602, the method includes physically associating package tracking device 400, having the unique device identification number, with the package. At step 1604, the method further includes retrieving information about the package, including one or more of unique package identification numbers, sender details, recipient details, and package delivery site coordinates. At step 1606, the method further includes linking the unique package identification number of the package with the unique device identification number of package tracking device 400 associated therewith. At step 1608, the method further includes determining location coordinates of package tracking device 400. At step 1610, the method further includes generating a first signal when the location coordinates of package tracking device 400 are within a range of a predefined distance threshold from the package delivery site coordinates. At step 1612, the method further includes generating a second signal when the location coordinates of the package tracking device 400 are outside of the range of a predefined distance threshold from the package delivery site coordinates. At step 1614, the method further includes alerting a recipient of the package, based on the recipient details, upon generation of the second signal. In one or more embodiments, the method further includes retrieving information about delivery of the package based on the sender details, generating an arm signal upon confirmation of the package being delivered; and initiating determination of the location coordinates of package tracking device 400 upon generation of the arm signal. In one or more embodiments, the method further includes initiating detection of motion of package tracking device 400 upon generation of the first signal; generating a motion signal upon detection of motion of package tracking device 400; and initiating determination of the location coordinates of package tracking device 400 upon generation of the motion signal. In one or more embodiments, the method further includes determining the location coordinates of package tracking device 400 at a first frequency upon generation of the first signal and at a second frequency upon generation of the second signal, with the second frequency being higher than the first frequency, with the second frequency being defined based on a preset condition including at least one of a preset time interval, and a preset distance interval from the outside of the predefined distance threshold from the package delivery site coordinates.

Package tracking device 400 of the present disclosure is a self-contained theft deterrent and tracking device that can be affixed to almost any type of package. Package tracking device 400, when implemented in system 100 of the present disclosure, allows the end-user (recipient) to locate and "watch" their package from the moment the carrier delivers it until it is safely in their hands. Package tracking device 400 not only provides the location of the package at any time after delivery but can also alert the intended recipient if the package has been moved beyond certain limits and automatically activate an audible alert and real-time tracking. Package tracking device 400 is also capable of communicating with home automation and security systems for enhanced capabilities.

The foregoing descriptions of specific embodiments of the present disclosure have been presented for purposes of illustration and description. They are not intended to be exhaustive or to limit the present disclosure to the precise forms disclosed, and obviously, many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

We claim:

1. A method for deterring theft of a package, the method comprising:
    associating a package with a package tracking device having a unique device identification number;
    associating a geofencing with a delivery location of the package, wherein the geofencing comprises area surrounding the delivery location with a fixed-length range;
    generating an arm signal upon, at least one of: receiving a confirmation of the package being delivered to the delivery location, and detecting a real-time location coordinate of the package to be within the geofencing;
    activating, on receipt of the arm signal, the package tracking device to operate in a passive tracking mode, wherein, when operating in the passive tracking mode, a location determination module and a motion sensing module, associated with the package tracking device, are enabled, wherein, in the passive tracking mode, using the location determination module, live location information of the package is determined and shared to a remote computer at a first frequency;
    generating a first signal when a motion of the package is detected by the motion sensing module;
    generating a second signal when the live location information from location determination module indicates the package to be outside the geofencing;
    activating, on a the generation of a at least one of the second signal and the first signal, the package tracking device to operate in an active tracking mode, wherein, in the active tracking mode, using the location determination module, the live location information of the package is determined and shared to the remote computer at a second frequency that is higher than the first frequency;
    providing an alert to a registered recipient of the package, along with the live location information of the package, when the package tracking device operates in the active tracking mode;
    activating a microphone module, attached with the package tracking device, to record sound surrounding the package, when the first signal is generated.

2. The method of claim 1, wherein the package tracking device receives the arm signal from the remote computer on confirmation of delivery of the package to the delivery location.

3. The method of claim 1, wherein location information associated with the geo-fencing is stored in a local memory of the package tracking device, and the arm signal is auto-generated by the package tracking device when the package tracking device enters the geofencing.

4. The method of claim 1, wherein the geofencing is associated with the delivery location, by a user through an application interface and is pushed to the package tracking device using the unique identification number.

5. The method of claim 1, wherein the second frequency is defined based on a predefined condition comprising at least one of a predefined time interval and a predefined distance interval from outside of the geofencing, wherein the predefined time interval represents an amount of time that has lapsed post generation of the second signal, and the predefined distance interval represents a distance travelled by the package tracking device post generation of the second signal.

6. The method of claim 1, wherein the second signal is sent to a user device along with the location information and other package information.

7. The method of claim 1 further comprises causing to generate, through a speaker attached with the package tracking device, a warning chirp when the first signal is generated and a second warning when the second signal is generated.

8. The method of claim 1, wherein the unique device identification number is used for tracking the package once the arm signal is generated.

9. A package tracking device comprising-
a battery;
anon-volatile memory unit to hold instructions; and
a processing unit to execute instructions to:
store geofencing information associated with a delivery location of a package to be tracked;
enable a location determination module and a motion sensing module, on receipt of an arm signal, to operate in a passive tracking mode, wherein the arm signal indicates at least one of a confirmation of the package being delivered to the delivery location, and detecting a real-time location coordinate of the package to be within the geofencing, wherein, in the passive tracking mode, live location information of the package is determined and shared with a remote computer at a first frequency;
generate a first signal when a motion of the package is detected;
generate a second signal when the location information indicates the package to be outside the geofencing; and
operating in an active tracking mode, on the generation of at least one of the second signal and the first signal, to track and share the live location information of the package with the remote computer at a second frequency that is higher than the first frequency,
wherein an alert is provided to a registered recipient of the package, along with the live location information of the package, when the package tracking device operates in the active tracking mode;
a microphone configured to record sound once the first signal is generated.

10. The package tracking device of claim 9 comprises a wireless communication module to-
receive geofencing information to be associated with the delivery location; and
send the first signal and the second signal to at least the remote computer or a portable device associated with a registered recipient of the package.

11. The package tracking device of claim 10, wherein the wireless communication module uses SMS, cellular call, cellular data network, or wireless data network to send the first signal and the second signal.

12. The package tracking device of claim 10, wherein the wireless communication module is used to send the live location information to the remote computer.

13. The package tracking device of claim 9, further comprises a dye pack module having a trigger that, when activated, causes a dye material to be released from a dye pack.

14. The package tracking device of claim 9, comprises a speaker that plays a warning chirp when the first signal is generated and plays a second warning sound when the second signal is generated.

15. The package tracking device of claim 9, wherein the arm signal is received from the remote computer.

16. The package tracking device of claim 9, wherein the arm signal is generated locally on a press of a button or automatically when the package enters the geofencing.

17. A system for deterring theft of a package, the system comprising:
a package tracking device that is associated with a package to be tracked; and
a remote computer communicatively coupled with the package tracking device to control the package tracking device,
wherein the package tracking device is configured to:
retrieve information about the package;
associate the package with the package tracking device having a unique device identification number;
store geofencing information associated with a delivery location of the package;
enable a location determination module and a motion sensing module, on receipt of an arm signal, to operate in a passive tracking mode, wherein the arm signal indicates at least one of a confirmation of the package being delivered to the delivery location, and detecting a real-time location coordinate of the package to be within the geofencing, wherein, in the passive tracking mode, live location information of the package is determined and shared with the remote computer at a first frequency;
generate a first signal when a motion of the package is detected;
generate a second signal when the location information indicates the package to be outside the geofencing; and
operate in an active tracking mode, on the generation of at least one of the second signal and the first signal, to track and share the live location information of the package with the remote computer at a second frequency that is higher than the first frequency;
wherein an alert is provided to a registered recipient of the package, along with the live location information of the package, when the package tracking device operates in the active tracking mode;
wherein the package tracking device comprises a microphone configured to record sound once the first signal is generated.

18. The system of claim 17, wherein the package tracking device comprises a wireless communication module to-
receive geofencing information to be associated with the delivery location; and
send the first signal and the second signal to at least the remote computer or a portable device associated with a registered recipient of the package.

19. The system of claim 18, wherein the wireless communication module uses SMS, cellular call, cellular data network, or wireless data network to send the first signal and the second signal.

20. The system of claim 18, wherein the wireless communication module is used to send the live location information to the remote computer.

21. The system of claim 17, the package tracking device, comprises a dye pack module having a trigger that, when activated, causes a dye material to be released from a dye pack.

22. The system of claim 17, wherein the package tracking device comprises a speaker that plays a warning chirp when the first signal is generated and plays a second warning sound when the second signal is generated.

23. The system of claim 17, wherein the arm signal is received at the package tracking device from the remote computer.

24. The system of claim 17, wherein the arm signal is generated locally at the package tracking device on a press of a button or automatically when the package enters the geofencing.

* * * * *